US012478539B2

(12) United States Patent
Kim et al.

(10) Patent No.: US 12,478,539 B2
(45) Date of Patent: Nov. 25, 2025

(54) INFORMATION OUTPUT APPARATUS

(71) Applicants: DOT INCORPORATION, Seoul (KR); KOREA ADVANCED INSTITUTE OF SCIENCE AND TECHNOLOGY, Daejeon (KR)

(72) Inventors: Ju Yoon Kim, Gimpo-si (KR); Ji Ho Kim, Gimpo-si (KR); Hyeon Cheol Park, Gwangmyeong-si (KR); Dong Soo Kwon, Daejeon (KR); Jun Yung Kim, Suwon-si (KR)

(73) Assignees: Dot Incorporation, Seoul (KR); Korea Advanced Institute of Science and Technology, Daejeon (KR)

( * ) Notice: Subject to any disclaimer, the term of this patent is extended or adjusted under 35 U.S.C. 154(b) by 913 days.

(21) Appl. No.: 17/103,016

(22) Filed: Nov. 24, 2020

(65) Prior Publication Data

US 2021/0077337 A1    Mar. 18, 2021

Related U.S. Application Data

(63) Continuation-in-part of application No. PCT/KR2019/006181, filed on May 23, 2019.

(30) Foreign Application Priority Data

May 24, 2018    (KR) ........................ 10-2018-0058933

(51) Int. Cl.
*G09B 21/00*    (2006.01)
*A61H 3/06*    (2006.01)

(52) U.S. Cl.
CPC ........... *A61H 3/061* (2013.01); *G09B 21/003* (2013.01); *G09B 21/004* (2013.01); *A61H 2003/063* (2013.01)

(58) Field of Classification Search
CPC ........................ G09B 21/004; G09B 21/005
See application file for complete search history.

(56) References Cited

U.S. PATENT DOCUMENTS

| 4,871,992 A | * | 10/1989 | Petersen | ............... G09B 21/003 |
| | | | | 340/407.1 |
| 5,766,014 A | * | 6/1998 | Ida | ............................ G09F 9/37 |
| | | | | 434/114 |

(Continued)

FOREIGN PATENT DOCUMENTS

| JP | H09-305100 A | 11/1997 |
| JP | 2002-156898 A | 5/2002 |

(Continued)

OTHER PUBLICATIONS

Translation KR20150001414U (Year: 2015).*

(Continued)

*Primary Examiner* — Eugene L Kim
*Assistant Examiner* — Alyssa M Hylinski
(74) *Attorney, Agent, or Firm* — Knobbe, Martens, Olson & Bear, LLP

(57) ABSTRACT

This application relates to an information output apparatus including at least one information output unit. The information output unit includes a coil unit connected to a power source to allow an electric current to flow therethrough and a base unit formed to accommodate the coil unit. The information output unit also includes an expression unit formed and arranged to allow a user to sense the expression unit and a driving unit arranged in the base unit to be separated from the coil unit. The driving unit is adjacent to the coil unit to be driven by the electric current flowing (Continued)

through the coil unit to perform an angular or rotational movement so as to move the expression unit in a first direction towards the coil unit and an opposite direction.

11 Claims, 19 Drawing Sheets

(56) References Cited

U.S. PATENT DOCUMENTS

| | | | | |
|---|---|---|---|---|
| 6,734,785 | B2* | 5/2004 | Petersen | G09B 21/004 |
| | | | | 340/407.1 |
| 6,827,512 | B1* | 12/2004 | Souluer | G09B 21/025 |
| | | | | 434/114 |
| 11,322,003 | B2* | 5/2022 | Kim | G06F 3/01 |
| 11,335,207 | B2* | 5/2022 | Cohen | G09B 21/004 |
| 11,455,910 | B2* | 9/2022 | Bailey | G09B 21/02 |
| 11,574,559 | B2* | 2/2023 | Cohen | G06F 3/0205 |
| 11,586,289 | B2* | 2/2023 | Kwon | G09B 21/003 |
| 12,039,883 | B2* | 7/2024 | Lee | H01F 5/04 |
| 12,260,743 | B2* | 3/2025 | Kim | G08B 6/00 |
| 2002/0050923 | A1* | 5/2002 | Petersen | G09B 21/004 |
| | | | | 340/407.1 |
| 2003/0073058 | A1* | 4/2003 | Tretiakoff | G09B 21/004 |
| | | | | 434/112 |
| 2009/0023116 | A1* | 1/2009 | Shaw | G09B 21/004 |
| | | | | 434/114 |
| 2015/0379895 | A1* | 12/2015 | Chari | G09B 21/004 |
| | | | | 434/114 |
| 2017/0309203 | A1* | 10/2017 | Kim | G09B 21/006 |

FOREIGN PATENT DOCUMENTS

| | | | |
|---|---|---|---|
| JP | 2004-317729 | A | 11/2004 |
| JP | 2005-266358 | A | 9/2005 |
| KR | 2012-0031779 | A | 4/2012 |
| KR | 20150001414 | U * | 4/2015 |
| KR | 10-2017-0052384 | A | 5/2017 |
| KR | 10-2017-0071458 | A | 6/2017 |
| KR | 10-2017-0125761 | A | 11/2017 |
| KR | 10-2019-0133928 | A | 12/2019 |

OTHER PUBLICATIONS

International Search Report and Written Opinion mailed Aug. 29, 2019 in International Application No. PCT/KR2019/006181, in 9 pages. (English translation of ISR.).

Notice of Allowance received in corresponding Korean Application No. 10-2024-0008215 dated Apr. 22, 2024.

* cited by examiner

INFORMATION OUTPUT APPARATUS

CROSS REFERENCE TO RELATED APPLICATIONS

The present application is a continuation-in part of International Patent Application No. PCT/KR2019/006181, filed on May 23, 2019, which claims priority to Korean patent application No. 10-2018-0058933 filed on May 24, 2018, contents of both of which are incorporated herein by reference in their entireties.

BACKGROUND

Technical Field

One or more embodiments relate to an information output apparatus.

Description of Related Technology

Users may recognize information in various ways. To this end, various types of information output apparatuses are being used.

For example, a visual information output apparatus using a printed material, an audio information output apparatus via sound, etc. are used.

In particular, according to an increase in an amount of information and development of technology, information output apparatuses using electronic technologies are widely used nowadays, and a display apparatus having a plurality of pixels is frequently used as a visual information output apparatus.

However, because such a display apparatus includes various circuits, etc. therein, easiness in manufacturing is reduced and it is inconvenient to control the display apparatus.

SUMMARY

One or more embodiments of the present disclosure provide an information output apparatus having an improved durability and improved user convenience.

Provided is an information output apparatus including at least one information output unit, the information output unit includes a coil unit connected to a power source to allow an electric current to flow therethrough, a base unit formed to accommodate the coil unit, an expression unit formed and arranged to allow a user to sense the expression unit, and a driving unit arranged in the base unit to be separated from the coil unit, and the driving unit being adjacent to the coil unit to be driven by the electric current flowing through the coil unit to perform an angular or rotational movement so as to move the expression unit in a first direction towards the coil unit and an opposite direction.

According to the embodiment, the driving unit may include a magnetic unit having regions of different polarities from each other.

According to the embodiment, the information output apparatus may further include a driving controller arranged on at least one surface of the driving unit, wherein the driving unit may perform the angular or rotational movement about the driving controller to drive the expression unit.

According to the embodiment, the driving unit may include a driving surface on at least an outer surface and may transfer a driving force to the expression unit via the driving surface, and the driving surface may include a curved surface.

According to the embodiment, the base unit may further include a first accommodation unit for accommodating the coil unit and a second accommodation unit for accommodating the driving unit, the second accommodation unit being arranged adjacent to the first accommodation unit in the first direction.

According to the embodiment, the information output apparatus may further include a boundary unit between the first accommodation unit and the second accommodation unit, the boundary unit distinguishing the first accommodation unit from the second accommodation unit.

According to the embodiment, the information output apparatus may further include a support unit arranged in the base unit, the support unit supporting the driving unit when the driving unit is moved.

According to the embodiment, the driving unit may include a driving surface on at least an outer surface and may transfer a driving force to the expression unit via the driving surface, and the support unit may be separated from the driving surface.

According to the embodiment, the information output apparatus may include a plurality of information output units, wherein the plurality of information output units may be arranged to be separated from one another in one direction or in another direction.

Other aspects, features and advantages of the disclosure will become better understood through the accompanying drawings, the claims and the detailed description.

An information output apparatus according to an embodiment has an improved durability and may improve user's convenience.

DETAILED DESCRIPTION

Figure 1:
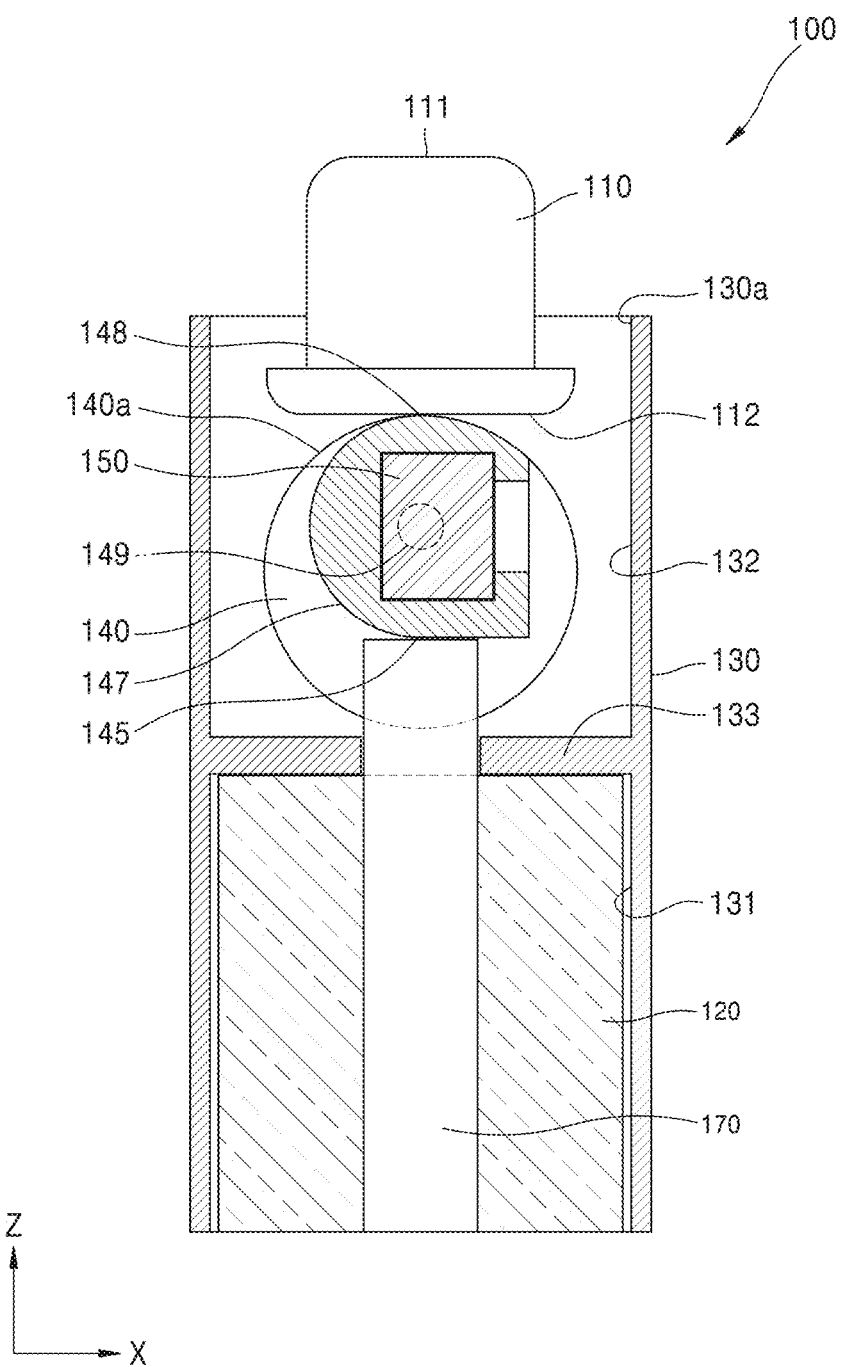
FIG. 1 is a transparent front view schematically showing an information output apparatus according to an embodiment of the disclosure.

Various forms of information output are required due to the development of technology, diversification of lifestyle, etc. For example, various information output apparatuses may be required according to a situation of each user, and in particular, when a user has a certain weakened sense, for example, when the user is visually impaired, it is necessary to output information through tactile sense. When information is output through the tactile sense, it is difficult to control and to stably operate the output operation, and thus, there is a limitation in improving user's convenience through improvement of the information output apparatus.

As the present disclosure allows for various changes and numerous embodiments, particular embodiments will be illustrated in the drawings and described in detail in the written description. The attached drawings for illustrating one or more embodiments are referred to in order to gain a sufficient understanding, the merits thereof, and the objectives accomplished by the implementation. However, the embodiments may have different forms and should not be construed as being limited to the descriptions set forth herein.

The embodiments will be described below in more detail with reference to the accompanying drawings. Those components that are the same or are in correspondence are rendered the same reference numeral regardless of the figure number, and redundant explanations are omitted.

While such terms as "first," "second," etc., may be used to describe various components, such components are not be limited to the above terms. The above terms are used only to distinguish one component from another.

An expression used in the singular encompasses the expression of the plural, unless it has a clearly different meaning in the context.

In the present specification, it is to be understood that the terms "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Sizes of components in the drawings may be exaggerated for convenience of explanation. In other words, since sizes and thicknesses of components in the drawings are arbitrarily illustrated for convenience of explanation, the following embodiments are not limited thereto.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

Figure 2:
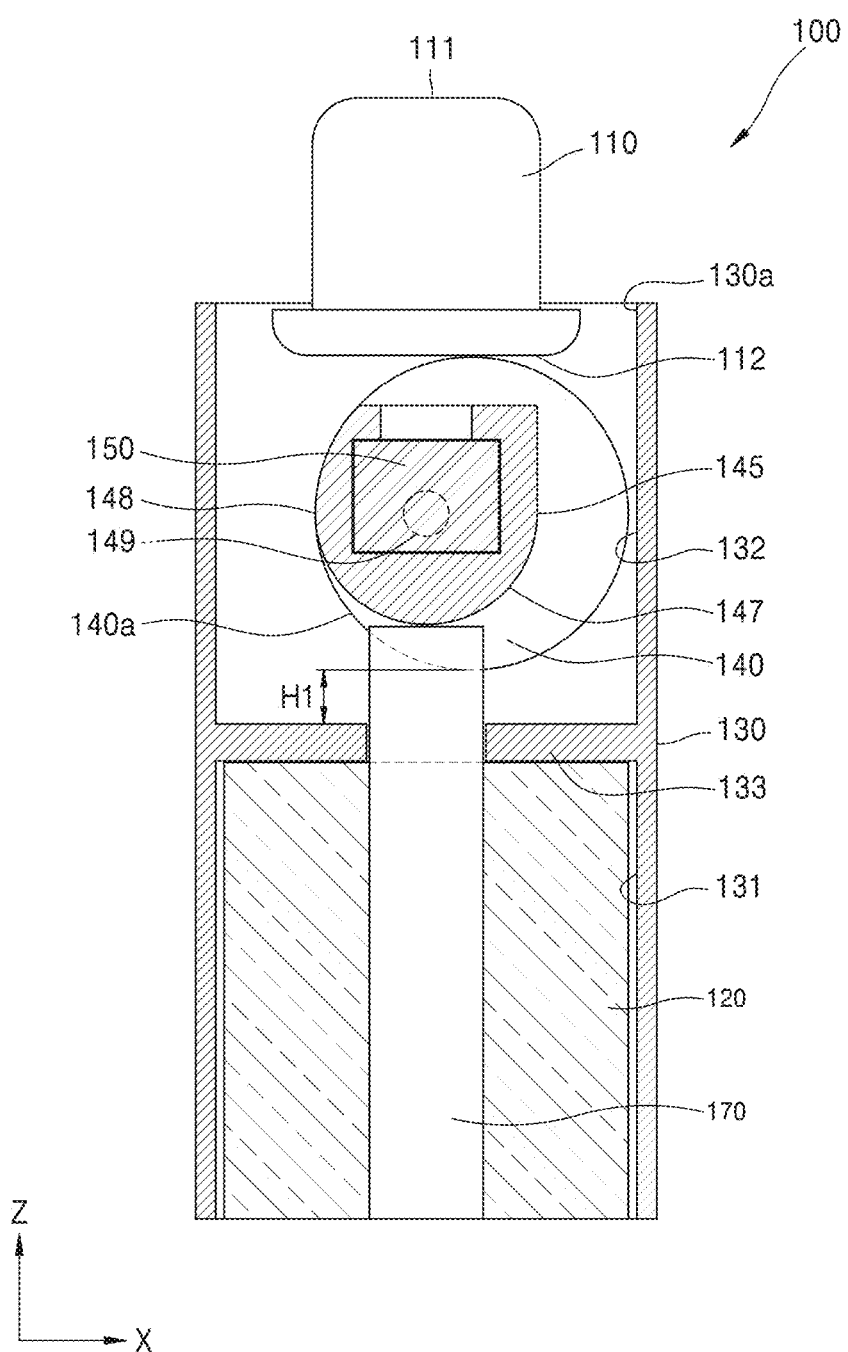
FIG. 2 and FIG. 3 are diagrams for describing operations of the information output apparatus of FIG. 1.
Figure 3:
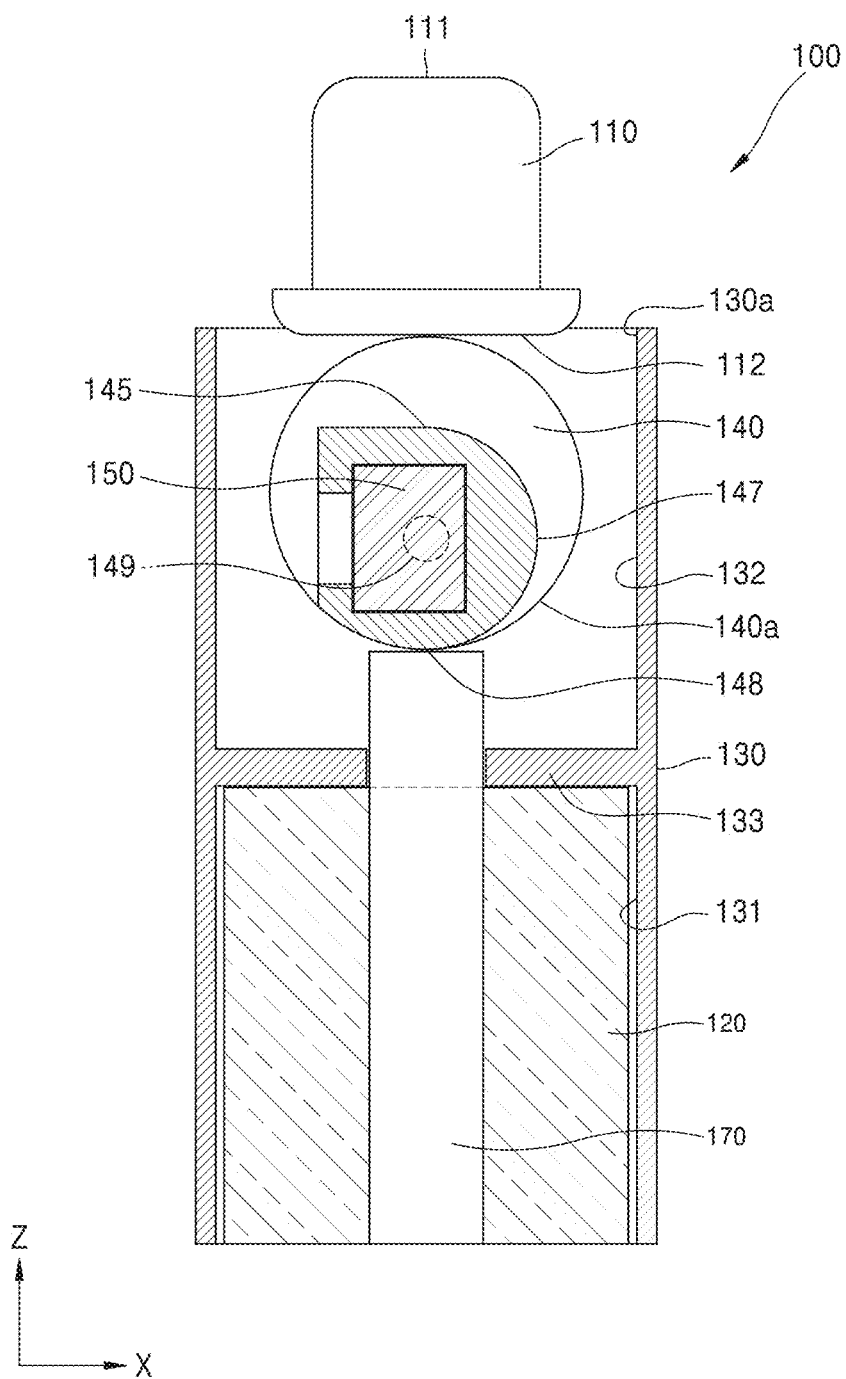

FIG. 1 is a transparent front view schematically showing an information output apparatus according to an embodiment of the disclosure, and FIG. 2 and FIG. 3 are diagrams for describing operations of the information output apparatus of FIG. 1.

Referring to FIG. 1 to FIG. 3, an information output apparatus 100 according to the embodiment includes at least one information output unit, and FIG. 1 shows one information output unit. That is, the information output apparatus 100 of FIG. 1 may be one information output unit.

Although FIG. 1 shows one information output unit, the information output apparatus 100 may include two, three, or more information output units in an alternative embodiment.

That is, the information output apparatus 100 may include variety numbers of information output units according to a purpose of using the product, characteristics of an applied product, and user characteristics.

For convenience of description, the information output apparatus including one information output unit as shown in FIG. 1 will be described below.

The information output apparatus 100 may include a coil unit 120, a base unit 130, a driving unit 140, and an expression unit 110.

The expression unit 110 may be moved according to movement of the driving unit 140 that will be described later, that is, may be moved at least in upper and lower directions based on a lengthwise direction thereof. For example, the expression unit 110 may be moved in a direction towards the coil unit 120 and an opposite direction.

As such, the expression unit 110 may be moved to protrude in one direction, and a user may sense the movement of the expression unit 110 through a tactile or visual sense.

The expression unit 110 may include an expression surface 111 and a supporting surface 112.

The supporting surface 112 in the expression unit 110 faces the driving unit 140, and forms a lower portion of the expression unit 110 and may be in contact with the driving unit 140. The driving unit 140 may transmit power to the expression unit 110 via the supporting surface 112. For example, a driving surface 140*a* of the driving unit 140 may be in contact with the supporting surface 112 to move the supporting surface 112 in a first direction, that is, a Z-axis direction based on FIG. 1.

The expression surface 111 is an outermost side of the expression unit 110, for example, a region farthest from the coil unit 120, and may include a region recognized by a user.

For example, the user may recognize the entire area of the expression unit 110, but may also recognize only the expression surface 111. For example, the user may sense the movement of the expression unit 110 by contacting the expression surface 111, and may easily sense the movement of the expression unit 110 by visually sensing the expression surface 111.

In an alternative embodiment, the expression surface 111 may include a curved surface.

The expression unit 110 may have various shapes including a pillar-shaped region, for example, a region having a similar shape to a cylindrical shape.

Also, in an alternative embodiment, a protruding region of the expression unit 110 may have a curved surface or a corner may have a curved surface.

The expression unit 110 may include various materials, for example, an insulating material that is light-weight and has an excellent durability. For example, the expression unit 110 may include a resin-based organic material. In another example, the expression unit 110 may include an inorganic material such as a ceramic material.

Also, in another alternative embodiment, the expression unit 110 may include a material such as metal or glass.

The coil unit 120 may be connected to an external power source (not shown). When an electric current flows through the coil unit 120, a magnetic field may be generated around the coil unit 120.

The coil unit 120 may have various shapes, for example, the coil unit 120 may have a form in which a wire is wound a plurality of times, wherein the number of times of winding the wire may be variously adjusted.

The driving unit 140 may be moved via the magnetic field generated due to the electric current flowing through the coil unit 120, and a driving force for moving the expression unit 110 may be provided through the movement of the driving unit 140.

In an alternative embodiment, a support unit 170 may be further provided, and the support unit 170 may be arranged such that at least a part of the support unit 170 may be adjacent to or support the coil unit 120.

For example, the support unit 170 includes an elongated portion to penetrate through the coil unit 120, and in particular, a plurality of coils of the coil unit 120 may be wound around the support unit 170.

In an alternative embodiment, an end of the support unit 170 may be elongated to support the driving unit 140 that will be described later, and the driving unit 140 may be moved while being supported by the end of the support unit 170.

In an alternative embodiment, the support unit 170 may correspond to a penetration portion 130H of the base unit 130.

In an alternative embodiment, the support unit 170 may include a magnetic body, and as a specific example, an extension member 171 may include a magnetic body. As such, a magnitude of the magnetic field may increase when the magnetic field is generated by the coil unit 120, and the magnetic field generation may be effectively performed to reduce power consumption of the information output apparatus 100.

The base unit 130 may accommodate the coil unit 120. For example, the base unit 130 may include a first accommodation unit 131 and a second accommodation unit 132.

The first accommodation unit 131 and the second accommodation unit 132 may be adjacent to each other, and may not overlap each other.

In an alternative embodiment, the first accommodation unit 131 and the second accommodation unit 132 may be apart from each other.

In another alternative embodiment, the first accommodation unit 131 and the second accommodation unit 132 may be connected to each other via a through hole.

The coil unit 120 may be arranged in the first accommodation unit 131. In an alternative embodiment, the support unit 170 may be arranged in the first accommodation unit 131, and a portion of the support unit 170 may extend into the second accommodation unit 132 via the through hole.

Although not shown in the drawings, in an alternative embodiment, a driving groove (not shown) may be formed in the second accommodation unit 132 of the base unit 130. For example, the driving groove (not shown) may be formed in each of opposite side surfaces facing each other in the second accommodation unit 132, and in an alternative embodiment, may extend in one direction, for example, in a direction away from the coil unit 120.

The base unit 130 may be elongated to accommodate the coil unit 120 and the driving unit 140 and may entirely surround the coil unit 120 and the driving unit 140.

In an alternative embodiment, the base unit 130 may include a boundary unit 133 between the first accommodation unit 131 and the second accommodation unit 132.

The first accommodation unit 131 and the second accommodation unit 132 may be separated from each other by the boundary unit 133.

Due to the boundary unit 133, even when the support unit 170 includes a magnetic body, the motion of the support unit 170 may be limited when a current flows through the coil unit 120, for example, the support unit 170 may be fixed.

In an alternative embodiment, the boundary unit 133 may have a through hole, through which a portion of the support unit 170 may extend and pass.

Also, the base unit 130 includes an entry unit 130a which may be connected to the second accommodation unit 132. The expression unit 110 may move through the entry unit 130a such that a length of the portion protruding out of the base unit 130 may change.

The driving unit 140 may be arranged in the base unit 130. The driving unit 140 may be arranged in the second accommodation unit 132 and may be separated from the coil unit 120 that is in the first accommodation unit 131.

The driving unit 140 is arranged adjacent to the coil unit 120 and is driven by the electric current flowing through the coil unit 120 to perform an angular movement or a rotational movement. The expression unit 110 may move in upper and lower directions, for example, in one direction towards the coil unit and the opposite direction, via the driving unit 140.

In an alternative embodiment, a magnetic unit 150 may be arranged in the driving unit 140, for example, in an internal space of the driving unit 140. For example, the magnetic unit 150 may include a magnetic material, for example, a permanent magnet.

The magnetic unit 150 may include a first region (e.g., N-pole or S-pole) and a second region (e.g., S-pole or N-pole) having different polarities from each other, and the first region and the second region having the different polarities from each other may be arranged in a direction from the coil unit 120 towards the expression unit 110 at a point during the rotation of the driving unit 140, for example, in the Z-axis direction.

For example, based on FIG. 1, the first and second regions having different polarities in the magnetic unit 150 may be arranged in a direction from the coil unit 120 towards the expression unit 110, for example, Z-axis direction.

The driving unit 140 includes the driving surface 140a on at least an outer surface thereof, and the driving surface 140a is formed to support the expression unit 110 and provides a driving power to the up-and-down movement of the expression unit 110.

In an alternative embodiment, the driving surface 140a of the driving unit 140 is an outer surface that may include a curved surface. In more detail, the driving surface 140a of the driving unit 140 may include a boundary line that is formed similarly to a circle.

The driving unit 140 may include a driving controller 149.

A location of driving the driving unit 140 may be controlled by the driving controller 149. For example, when the driving unit 140 is moved by the coil unit 120, the driving unit 140 may perform an angular or rotational movement about the driving controller 149.

In an alternative embodiment, a central axis of the driving unit 140 and the driving controller 149 may not be coincident, but may be eccentric with respect to each other.

In addition, in an alternative embodiment, the magnetic unit 150 does not coincide with the central axis of the driving unit 140, and may be arranged, for example, to overlap a region of the driving unit 140.

As such, a torque force with respect to the driving unit 140 may be easily generated and allows the driving unit 140 to perform an angular or rotational movement such that a movement relative to the expression unit 110 may be performed effectively and a precise expression of the information output apparatus 100 may be improved. Also, power consumption of the information output apparatus 100 may be reduced.

For example, during the angular movement of the driving unit 140, once a force is applied only until the driving unit 140 reaches the critical point, the angular movement may be additionally performed even without additional force applied after that point.

As a specific example, only during a portion of the entire time of the operation process of the driving unit 140 changing from the state of FIG. 1 to the state of FIG. 3 or from the state of FIG. 3 to the state of FIG. 1, current is applied to the coil unit 120 and power may be consumed.

As an alternative embodiment, only at the initial stage including the start stage of the operation of the driving unit 140 that changes from the state of FIG. 1 to the state of FIG. 3 or from the state of FIG. 3 to the state of FIG. 1, current is applied to the coil unit 120, and once the driving unit 140 starts to move, due to the torque force through the eccentricity, the driving unit 140 may easily perform an angular movement.

Although not shown in the drawings the driving unit 140 may include a first driving member (not shown) and a second driving member (not shown), and a separate space (not shown) between the first and second driving members.

The first driving member (not shown) and the second driving member (not shown) may each include the driving surface 140a on at least one of outer surfaces thereof so as to support the expression unit 110 when the driving unit 140 is moved and to provide the expression unit 110 with the driving power. For example, the external boundary line (e.g., circle) of the driving unit 140 including the driving surface 140a shown in FIG. 1 may be a boundary line of the first driving member (not shown) or the second driving member (not shown).

Selectively, outer surfaces of the first driving member (not shown) and the second driving member (not shown) may include curved surfaces, for example, the driving surface 140a may include a curved surface.

For example, the first driving member (not shown) and the second driving member (not shown) may each have a shape similar to a rotator, and may each have a shape similar to a disc.

As such, when the first driving member (not shown) and the second driving member (not shown) perform the rotational or angular movement, the driving power is naturally provided to the supporting surface 112 of the expression unit 110 so that the expression unit 110 may effectively make continuous and natural movement.

The driving controller 149 may be arranged on at least one side surface of the driving unit 140, for example, on each of opposite side surfaces.

In an alternative embodiment, the driving controller 149 may have a protruding shape, that is, may protrude in a direction away from the side surface of the driving unit 140 (a direction protruding from the drawing based on FIG. 1), and the protruding shape of the driving controller 149 in the alternative embodiment may correspond to a driving groove (not shown) when the base unit 130 includes the driving groove (not shown).

For example, the driving unit 140 may be moved by the magnetic field generated due to the coil unit 120, and in detail, the driving unit 140 may move up and down due to a repulsive force and an attractive force applied to the magnetic unit 150 in the driving unit 140. Here, the driving unit 140 may move up and down while rotating around the driving controller 149.

In an alternative embodiment, the driving unit 140 may move in a state, in which the driving controller 149 of the driving unit 140 is arranged on a region of the base unit 130, for example, the driving groove (not shown) of the second accommodation unit 132.

A first moving region 145 and a second moving region 148 may be arranged in the separate space between the first driving member (not shown) and the second driving member (not shown).

The first moving region 145 and the second moving region 148 may be regions that respectively serve as references for a lowest point and a highest point of the movement of the driving unit 140.

In an alternative embodiment, a connecting region 147 may be arranged between the first moving region 145 and the second moving region 148, and the connecting region 147 may include a curved surface.

For example, when the first moving region 145 is at a lowermost portion, that is, a region closest to the coil unit 120 as shown in FIG. 1, the driving unit 140 is at the lowest point, and accordingly, the expression unit 110 is at the lowest point, in detail, a protrusion height of the expression unit 110 from the base unit 130 has a minimum value. Here, the first moving region 145 may be supported by an upper end of the support unit 170.

In addition, as an example, the first moving region 145 may be supported by the upper end of the support unit 170. In an embodiment, the first moving region 145 may be supported by the upper end of the support unit 170 through contact.

Through this, the state in which the expression unit 110 is at the lowest point may include being implemented by being physically latched by the upper end of the support unit 170.

In addition, although not illustrated, in the case where there is a protrusion region PT as described later, the first moving region 145 is supported by the top surface of the protrusion region PT, and the state in which the expression unit 110 is at the lowest point may include being implemented by being physically latched by the top surface of the protrusion region PT.

After that, when the electric current is applied to the coil unit 120 and the magnetic field is generated as shown in FIG. 2, the driving unit 140 may be moved. For example, when a repulsive force is applied to the magnetic unit 150 arranged on the driving unit 140, an end portion (a side of a polarity to which the repulsive force is applied) of the magnetic unit 150 is arranged away from the magnetic field such that the connecting region 147 may be supported by the upper end of the support unit 170. Referring to FIG. 2, the driving unit 140 rises, that is, an uppermost surface of the driving unit 140 rises, and accordingly, the expression unit 110 may slightly rise, that is, referring to FIG. 2, may rise by a height H1.

In an alternative embodiment, because the driving unit 140 rotates about the driving controller 149, the driving controller 149 may maintain the position thereof.

After that, when a state in which the electric current is applied to the coil unit 120 of FIG. 2 and the magnetic field is generated is maintained as shown in FIG. 3, the driving unit 140 may continuously move, for example, in the magnetic unit 150 arranged on the driving unit 140, an end portion of the magnetic unit 150, to which the attractive force is applied according to the magnetic field, is arranged in a direction towards the coil unit 120, and then, the second moving region 148 may be supported by the upper end of the support unit 170. Referring to FIG. 3, the driving unit 140 rises, that is, the uppermost surface of the driving unit 140 rises, and accordingly, the expression unit 110 may also rise, that is, the state shown in FIG. 3 may be the highest point of the expression unit 110.

In addition, as an example, the second moving region 148 may be supported by the upper end of the support unit 170. In an embodiment, the second moving region 148 may be supported by the upper end of the support unit 170 through contact.

Through this, the state in which the expression unit 110 is at a point which is different from the lowest point, as an alternative embodiment, at the highest point, may include being implemented by being physically latched by the upper end of the support unit 170.

In addition, although not illustrated, in the case where there is the protrusion region PT as described later, the second moving region 148 is supported by the top surface of the protrusion region PT, and the state in which the expression unit 110 is at the highest point may include being implemented by being physically latched by the top surface of the protrusion region PT.

In an alternative embodiment, because the driving unit 140 rotates about the driving controller 149, the driving controller 149 may maintain the position thereof.

In an alternative embodiment, moving from the state shown in FIG. 1 to the state shown in FIG. 3 may be continuously performed. The state shown in FIG. 2 is provided to describe a process, that is, when the state of FIG. 1 changes to the state of FIG. 2, the driving unit 140 and the expression unit 110 may not stop, but continuously move in the state of FIG. 2 to the state of FIG. 3.

For example, FIG. 1 and FIG. 3 show the states in which the expression unit 110 may be maintained at a stopped state, and FIG. 2 may illustrate the state in which the expression unit 110 is moving.

In an alternative embodiment, sequential moving processes shown in FIG. 1 to FIG. 3 may be also applied to embodiments that will be described later.

When the driving unit 140 rotates, the support unit 170 may support at least a portion of the connecting region 147 before supporting the second moving region 148 after supporting the first moving region 145, and as such, the driving unit 140 naturally moves and the movement of the expression unit 110 may be accurately controlled.

A distance between the driving surface 140*a* and the first moving region 145 may be different from a distance between the driving surface 140*a* and the second moving region 148. For example, the distance between the driving surface 140*a* and the first moving region 145 may be greater than the distance between the driving surface 145*a* and the second moving region 148.

In an alternative embodiment, due to the shape of the driving unit 140, a distance from the central axis to the first moving region 145 may be less than a distance from the central axis to the second moving region 148.

In an alternative embodiment, a distance from the driving controller 149 to the first moving region 145 may be equal or similar to a distance from the driving controller 149 to the second moving region 148, and in an additional alternative embodiment, a distance from the driving controller 149 to the connecting region 147 may be also equal or similar to the distance from the driving controller 149 to the second moving region 148.

For example, the connecting region 147 may correspond to at least a region of a circumference having a radius around a center point of the driving controller 149, and the first moving region 145 and the second moving region 148 may be formed as flat surfaces extending in parallel with each other from the regions facing each other and corresponding to a diameter of the circumference.

As such, when the driving unit 140 rotates about the driving controller 149, the position of the driving controller 149 may be maintained consistently or similarly when the support unit 170 supports the first moving region 145, the second moving region 148, and the connecting region 147.

Also, when being supported by the support unit 170, the connecting region 147 supported by the support unit 170 includes a curved surface or a nearly arc surface, and thus, the driving unit 140 may move smoothly and sufficiently.

Although not shown in the drawings, the second accommodation unit 132 of the base unit 130 may include a groove that is at least larger than the driving controller 149 so as to accommodate the driving controller 149.

The above description is about a case, in which the first moving region 145, the second moving region 148, and the connecting region 147 are arranged in the region including the driving surface 140*a* of the driving unit 140, for example, the separate space between the first driving member (not shown) and the second driving member (not shown). Also, this will be applied to embodiments that will be described later.

In another alternative embodiment, the first moving region 145, the second moving region 148, and the connecting region 147 may be arranged on the region including the driving surface 140*a* of the driving unit 140, for example, on an outer side surface of the first driving member (not shown) or the second driving member (not shown).

In addition, in another alternative embodiment, the region including the driving surface 140*a* of the driving unit 140, for example, one of the first driving member (not shown) or the second driving member (not shown) is formed, and then, the first moving region 145, the second moving region 148, and the connecting region 147 may be arranged on opposite side surfaces, and accordingly, the driving controller 149 may be on the region forming the first moving region 145, the second moving region 148, and the connecting region 147.

Also, the various alternative embodiments, that is, the structure including the first moving region 145, the second moving region 148, and the connecting region 147 on the region including the driving surface 140*a*, for example, an outer surface having a smaller size than that of the first driving member (not shown) or the second driving member (not shown), may include variously modified structures. Also, the above various embodiments may be applied to the embodiments that will be described later.

The information output apparatus according to the embodiment may include one or more information output units, the driving unit of the information output unit may be moved at least in a first direction or an opposite direction, and the expression unit is also moved in the first direction or the opposite direction according to the movement of the driving unit so as to output various information sensed by the user.

For example, the information output apparatus according to the embodiment may allow the user to sense the surface of the expression unit via a tactile sense when the expression unit protrudes. In more detail, the information output apparatus may output information in the form of braille output.

In an alternative embodiment, the information output apparatus may output visually sensible information, that is, when the expression unit protrudes, the user senses the expression unit visually. In particular, when one surface of the expression unit, for example, an upper surface is formed to have a color or to emit light, the visual effect may be improved.

As such, the information output apparatus according to the embodiment may output information to the user, and in an alternative embodiment, when the information output apparatus of the embodiment includes a plurality of information output units, various kinds of information may be output to the user.

Also, the driving unit may be easily moved in the first direction, for example, rises due to the magnetic field generated by the coil unit, and may be rotated while maintaining a certain region by the driving controller.

For example, when a repulsive force is generated by the magnetic field that is generated from the coil unit according to the polarity of the magnetic unit arranged in the driving unit, the driving unit may be moved up while rotating.

As such, the moving up and down of the driving unit may be performed softly and naturally, and accordingly, an irregular intermittence in moving up and down of the expression unit may be reduced. In addition, the flexible movement and precise motion may be easily controlled.

As the expression unit moves up and down, turning-on or turning-off state of the information output apparatus may be easily implemented.

Also, during the moving up and down operation of the driving unit, even when the force applied to the driving unit is removed, the status of the driving unit may be maintained through the supporting of the first moving region and the second moving region by the support unit.

That is, after the driving unit is moved up from a state, in which the first moving region is supported by an extension unit of the driving unit, to a state, in which the second moving region is supported by the extension unit, due to the magnetic field of the coil unit, the driving unit maintains the state in which the second moving region is supported by the extension even when the power connected to or an electric current or voltage applied to the coil unit is removed.

Also, after the driving unit is moved down from a state, in which the second moving region is supported by the extension, to a state, in which the first moving region is supported by the extension, due to the magnetic field in the opposite direction from the coil unit, the driving unit may maintain the state in which the first moving region is supported by the extension even when the power connected to or an electric current or voltage applied to the coil unit is removed.

As such, the turning-on or turning-off state of the expression unit of the information output apparatus may be easily switched and maintained, the power consumption for moving the expression unit may be reduced, and a total energy efficiency of the information output apparatus may be improved.

In addition, the driving controller included in the driving unit of the embodiment is eccentric with respect to the central axis of the driving unit, and accordingly, a torque may be easily generated on the driving unit to implement the moving up and moving down of the driving unit via the rotation, and thus, the movement of the expression unit may be controlled accurately, smoothly, and naturally.

In an alternative embodiment, the magnetic unit included in the driving unit may overlap the driving controller, for example, a center of the magnetic unit may overlap the driving controller.

As such, a variation in the position of the magnetic unit may be reduced when the driving unit rotates about the driving controller, for example, a consistent or similar distance between the coil unit and the magnetic unit may be maintained. As a result, uneven influence of the effects that the magnetic field exerts from the coil unit to the magnetic field may be reduced, and the movement of the driving unit may be accurately controlled.

Figure 4:
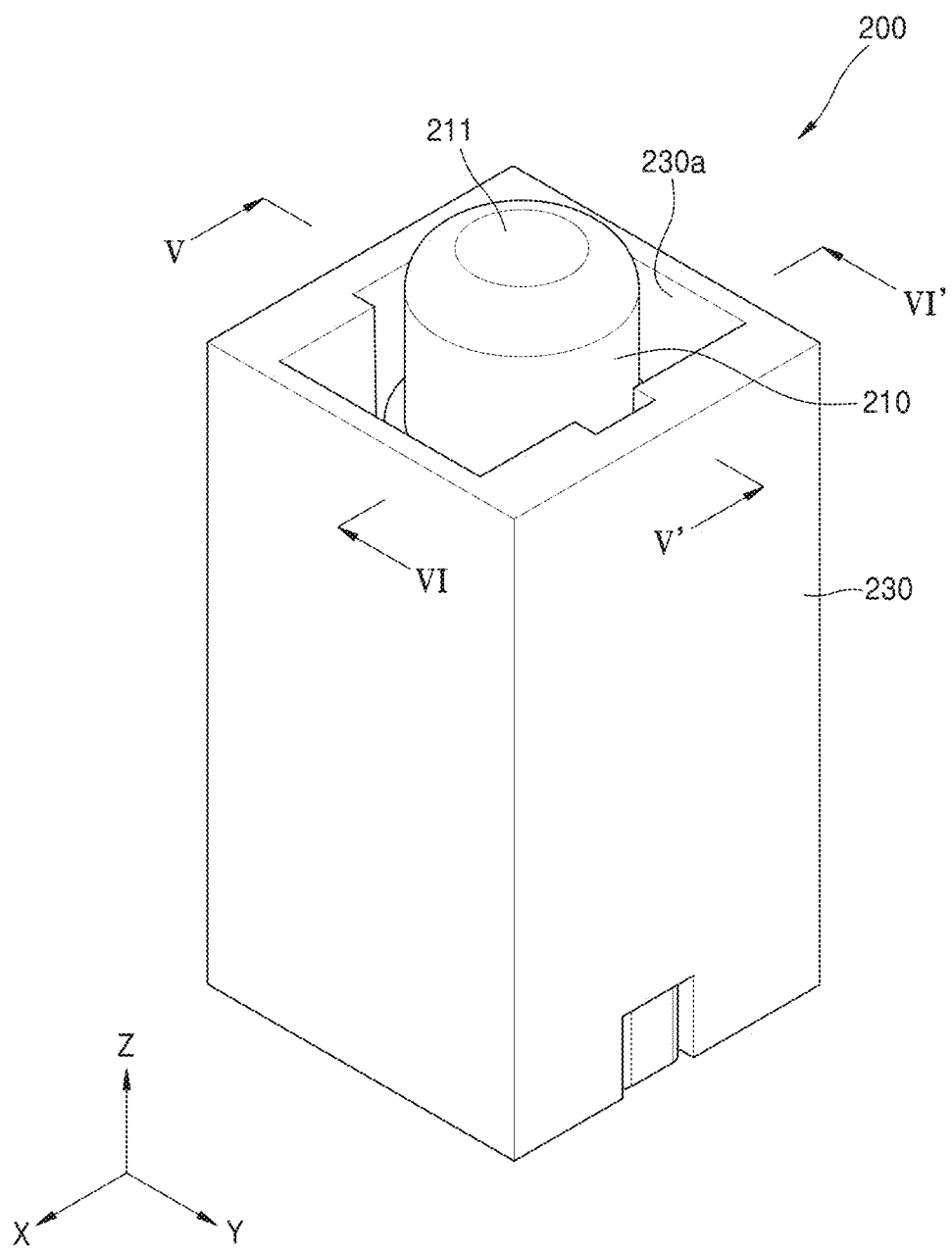
FIG. 4 is a perspective view schematically showing an information output apparatus according to another embodiment of the disclosure.
Figure 5:
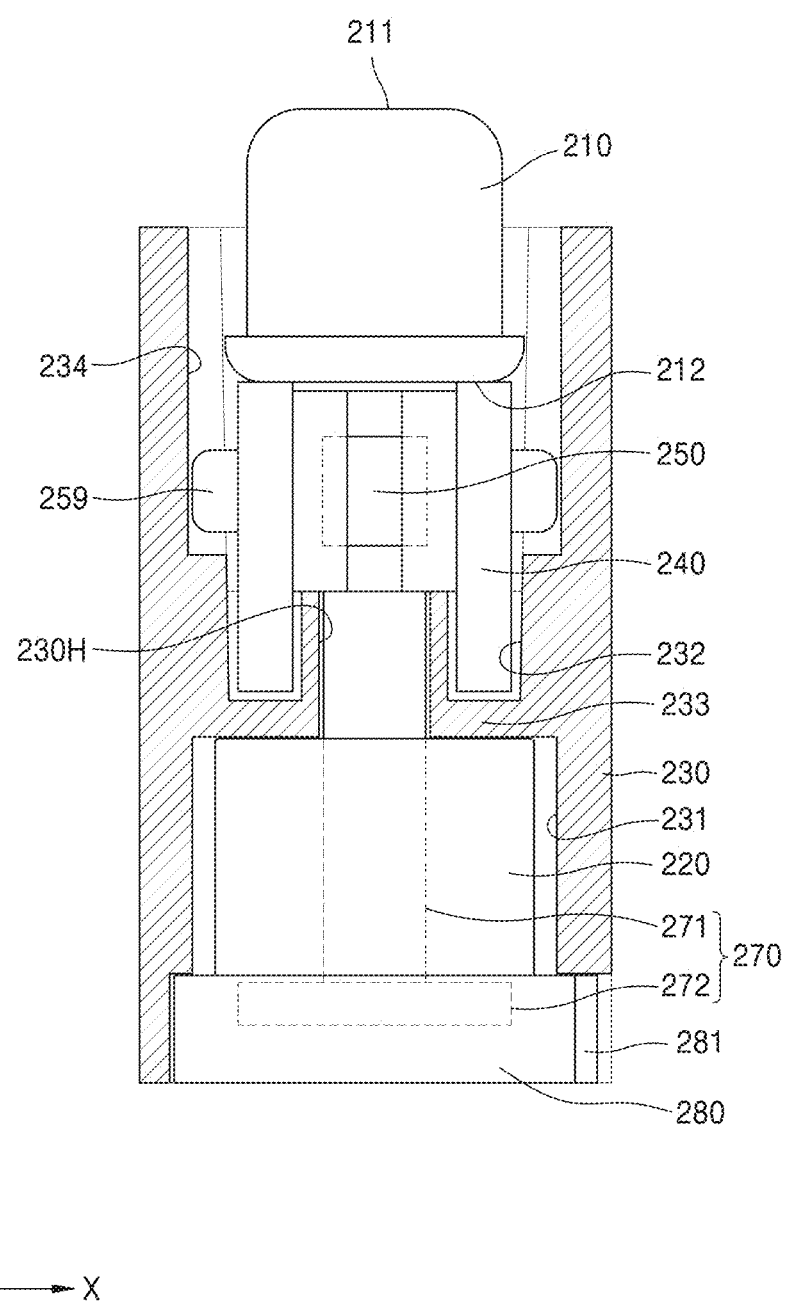
FIG. 5 is a cross-sectional view of the information output apparatus taken along line V-V of FIG. 4.
Figure 6:
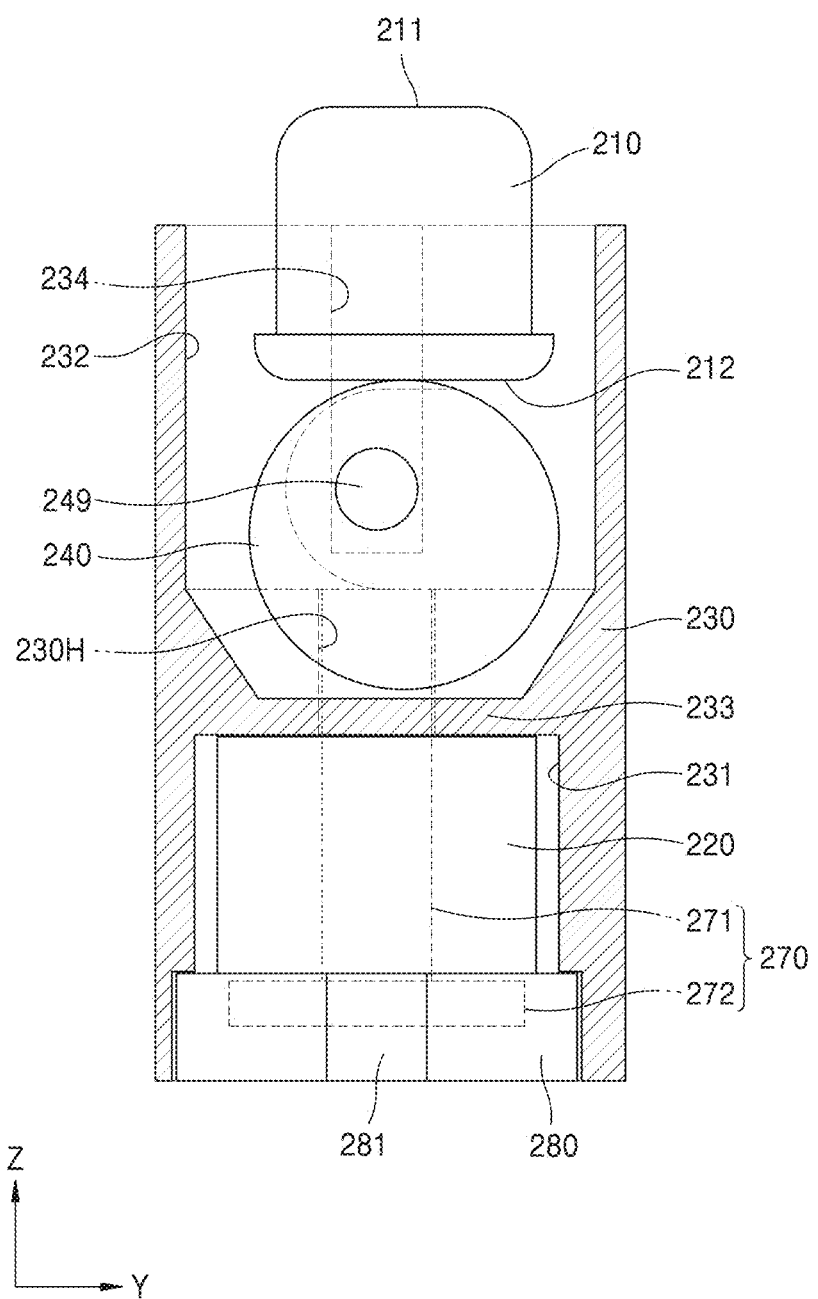
FIG. 6 is a cross-sectional view of the information output apparatus taken along line VI-VI of FIG. 4.

FIG. 4 is a perspective view schematically showing an information output apparatus according to another embodiment of the disclosure. FIG. 5 is a cross-sectional view of the information output apparatus taken along line V-V of FIG. 4, and FIG. 6 is a cross-sectional view (of the information output apparatus taken along line VI-VI of FIG. 4.

Referring to FIG. 4 to FIG. 9, an information output apparatus 200 according to the embodiment includes at least one information output unit, and FIG. 4 shows one information output unit. That is, the information output apparatus 200 of FIG. 4 may be one information output.

Although FIG. 4 shows one information output unit, the information output apparatus 200 may include two, three, or more information output units in an alternative embodiment.

That is, the information output apparatus 200 may include variety numbers of information output units according to a purpose of using the product, characteristics of an applied product, and user characteristics.

For convenience of description, the information output apparatus including one information output unit as shown in FIG. 4 will be described below.

The information output apparatus 200 may include a coil unit 220, a base unit 230, a driving unit 240, and an expression unit 210.

The expression unit 210 may be moved according to movement of the driving unit 240 that will be described later, that is, may be moved at least in upper and lower directions based on a lengthwise direction thereof. For example, the expression unit 210 may be moved in a direction towards the coil unit 220 and an opposite direction thereto.

As such, the expression unit 210 may be moved to protrude in one direction, and a user may sense the movement of the expression unit 210 through a tactile or visual sense.

The expression unit 210 may include an expression surface 211 and a supporting surface 212.

The supporting surface 212 in the expression unit 210 faces the driving unit 240, and forms a lower portion of the expression unit 210, which is in contact with the driving unit 240. The driving unit 240 may transmit a force to the expression unit 210 via the supporting surface 212.

The expression surface 211 is an outermost side of the expression unit 210, for example, a region farthest from the coil unit 220, and may include a region recognized by a user.

For example, the user may recognize the entire area of the expression unit 210, but may also recognize only the expression surface 211. For example, the user may sense the movement of the expression unit 210 by contacting the expression surface 211, and may easily sense the movement of the expression unit 210 by visually sensing the expression surface 211.

In an alternative embodiment, the expression surface 211 may include a curved surface.

The expression unit 210 may have various shapes including a pillar-shaped region, for example, a region having a shape similar to a cylindrical shape as shown in FIG. 4, etc.

Also, in an alternative embodiment, a protruding region of the expression unit 210 may have a curved surface or a corner of the expression unit 210 may have a curved surface.

The expression unit 210 may include various materials, for example, an insulating material that is light-weight and has an excellent durability. For example, the expression unit 110 may include a resin-based organic material. In another example, the expression unit 110 may include an inorganic material such as a ceramic material.

Also, in another alternative embodiment, the expression unit 210 may include a material such as metal or glass.

The coil unit 220 may be connected to an external power source (not shown). When an electric current flows through the coil unit 220, a magnetic field may be generated around the coil unit 220.

The coil unit 220 may have various shapes, for example, the coil unit 220 may have a form in which a wire is wound a plurality of times, wherein the number of times of winding the wire may be variously adjusted.

The driving unit 240 may be moved via the magnetic field generated due to the electric current flowing through the coil unit 220, and a driving power for moving the expression unit 210 may be provided through the movement of the driving unit 240.

In an alternative embodiment, a support unit 270 may be further provided, and the support unit 270 may be arranged such that at least a part of the support unit 270 may be adjacent to or support the coil unit 220.

For example, the support unit 270 includes an extension unit 271, and may be arranged so that the extension unit 271 passes through the coil unit 220, in more detail, the plurality of coils of the coil unit 220 are wound around the extension unit 271.

In an alternative embodiment, an end of the extension unit 271 may be elongated to support the driving unit 240 that will be described later, and the driving unit 240 may be moved while being supported by the end of the extension unit 271.

In an alternative embodiment, the extension unit 271 may correspond to a through hole 230H of the base unit 230.

In an alternative embodiment, the support unit 270 may include a main body 272 that may be connected to the extension unit 271 and may support the coil unit 220. For example, the coil unit 220 may include the coils wound around the extension unit 271 on the main body 272.

In an alternative embodiment, the main body 272 and the extension unit 271 of the support unit 270 may be integrated with each other.

In an alternative embodiment, a pedestal unit 280 may be further provided such that the main body 272 is arranged.

The pedestal unit 280 may be arranged to surround a bottom surface and side surfaces of the main body 272.

In an alternative embodiment, the pedestal unit 280 may include a protrusion 281 on a region thereof, and a region of the protrusion 281 is exposed to a side surface of the base unit 230 to be easily handled.

The base unit 230 may accommodate the coil unit 220. For example, the base unit 230 may include a first accommodation unit 231 and a second accommodation unit 232.

The first accommodation unit 231 and the second accommodation unit 232 may be adjacent to each other, and may not overlap each other.

In an alternative embodiment, the first accommodation unit 231 and the second accommodation unit 232 may be apart from each other.

In another alternative embodiment, the first accommodation unit 231 and the second accommodation unit 232 may be connected to each other via the through hole 230H.

The coil unit 220 may be arranged in the first accommodation unit 231. In an alternative embodiment, the support unit 270 or the pedestal unit 280 described above may be arranged in the first accommodation unit 231.

In an alternative embodiment, the second accommodation unit 232 of the base unit 230 may include a driving groove 234. For example, the driving groove 234 may be formed in each of opposite side surfaces facing each other in the second accommodation unit 232, and in an alternative embodiment, may extend in one direction, for example, in a direction away from the coil unit 220.

In an alternative embodiment, the driving groove 234 may be formed as a groove or a through hole penetrating to the outside. When the driving groove 234 does not penetrate to the outside of the base unit 230, but is formed to have a groove shape by removing a part from the inside, the exposure to the outside of the base unit 230 is reduced and contamination, damage, etc. to the driving unit 240 may be reduced. Thus, the accurate control may be performed.

The base unit 230 may be elongated to accommodate the coil unit 220 and the driving unit 240 and may entirely surround the coil unit 220 and the driving unit 240.

In an alternative embodiment, the base unit 230 may include a boundary unit 233 between the first accommodation unit 231 and the second accommodation unit 232.

The first accommodation unit 231 and the second accommodation unit 232 may be separated from each other by the boundary unit 233.

In an alternative embodiment, the boundary unit 233 may include the through hole 230H.

Also, the base unit 230 includes an entry portion 230a which may be connected to the second accommodation unit 232. The expression unit 210 may move through the entry portion 230a such that a length of the portion protruding out of the base unit 230 may change.

The driving unit 240 may be arranged in the base unit 230. The driving unit 240 may be arranged in the second accommodation unit 232 and may be separated from the coil unit 220 that is in the first accommodation unit 231.

The driving unit 240 is arranged adjacent to the coil unit 220 and is driven by the electric current flowing through the coil unit 220 to perform an angular or rotational movement. The expression unit 210 may move in upper and lower directions, for example, in one direction towards the coil unit and the opposite direction, via the driving unit 240.

In an alternative embodiment, the driving unit 240 may include a magnetic unit 250, for example, in an internal space thereof. For example, the magnetic unit 250 may include a magnetic material, for example, a permanent magnet.

The magnetic unit 250 may include a first region (e.g., N-pole or S-pole) and a second region (e.g., S-pole or N-pole) having different polarities from each other, and the first region and the second region having the different polarities from each other may be arranged in a direction from the coil unit 220 towards the expression unit 210 at a point during the rotation of the driving unit 240, for example, in the Z-axis direction.

For example, based on FIG. 5 and FIG. 6, the first and second regions having different polarities in the magnetic unit 250 may be arranged in a direction from the coil unit 220 towards the expression unit 210, for example, Z-axis direction.

The driving unit 240 includes a driving surface 241a on at least an outer surface, and the driving surface 241a is formed to support the expression unit 210 and provides a driving power to the up-and-down movement of the expression unit 210.

In an alternative embodiment, the driving surface 241a of the driving unit 240 is an external surface that may include a curved surface. In more detail, the driving surface 241a of the driving unit 240 may include a boundary line that is formed similarly to a circle.

The driving unit 240 may include a driving controller 249. A location of driving the driving unit 240 may be controlled by the driving controller 249. For example, when the driving unit 240 is moved by the coil unit 220, the driving unit 240 may perform an angular or rotational movement about the driving controller 249.

In an alternative embodiment, a central axis of the driving unit 240 and the driving controller 249 may not be coincident, but may be eccentric with respect to respect to each other.

In addition, in an alternative embodiment, the magnetic unit 250 does not coincide with the central axis of the driving unit 240, and may be arranged, for example, to overlap a region of the driving controller 249.

As such, a torque force with respect to the driving unit 240 may be easily generated and the driving unit 240 performs an angular or rotational movement such that a movement relative to the expression unit 210 may be performed effectively and a precise expression of the information output apparatus 200 may be improved. Also, power consumption of the information output apparatus 200 may be reduced.

The driving unit 240 will be described in more detail with reference to FIG. 7 to FIG. 9.

Figure 7:
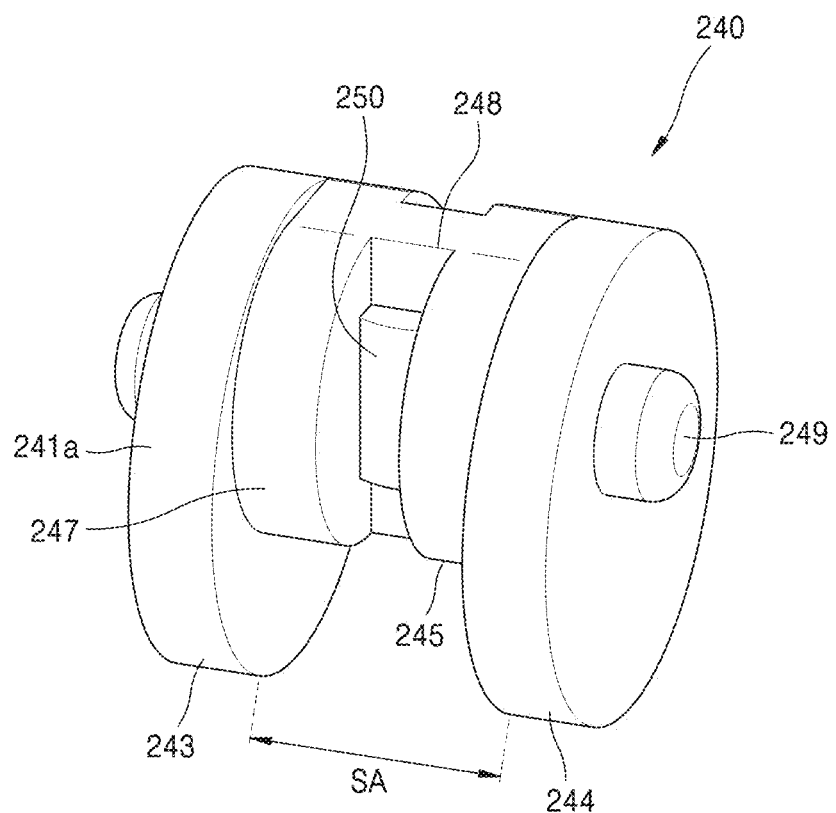
FIG. 7 is a perspective view for describing a driving unit of FIG. 4.
Figure 8:
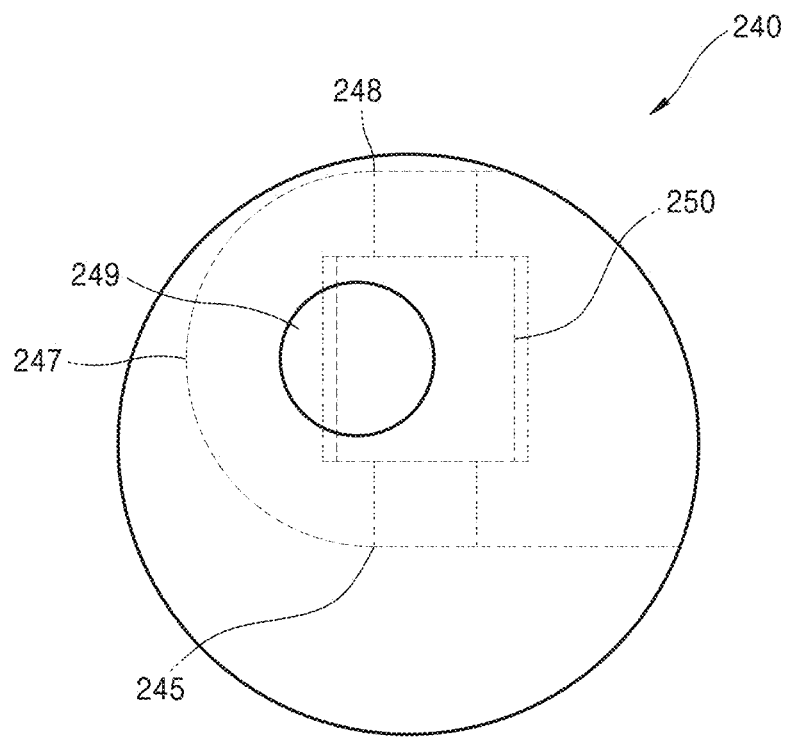
FIG. 8 is a front view of the driving unit seen from one direction of FIG. 7.

FIG. 7 is a perspective view for describing a driving unit of FIG. 4, and FIG. 8 is a front view of the driving unit seen from one direction of FIG. 7. FIG. 9 is a partially perspective view of a portion of a base unit of FIG. 4 seen from one direction.

Referring to FIG. 7 and FIG. 8, the driving unit 240 may include a first driving member 243 and a second driving member 244 and may include a separate area SA between the first and second driving members 243 and 244.

The first driving member 243 and the second driving member 244 may each include the driving surface 241a on at least one of outer surfaces thereof so as to support the expression unit 210 when the driving unit 240 is moved and to provide the expression unit 210 with the driving power.

In an alternative embodiment, the outer surfaces of the first and second driving members 243 and 244 may include curved surfaces. For example, the first driving member 243 and the second driving member 244 may each have a shape similar to a rotator, and may each have a shape similar to a disc.

As such, when the first driving member 243 and the second driving member 244 perform the rotational or angular movement, a driving power is naturally provided to the supporting surface 212 of the expression unit 210 so that the expression unit 210 may effectively perform continuous and natural movement.

The driving controller 249 may be arranged on at least one side surface of the first driving member 243 and the second driving member 244, for example, on each of the surfaces opposite to the side surfaces facing each other in the first driving member 243 and the second driving member 244.

In an alternative embodiment, the driving controller 249 may have a protruding shape which corresponds to the driving groove 234 of the base unit 230.

For example, the driving unit 240 may be moved by the magnetic field generated due to the coil unit 220, and in detail, the driving unit 240 may move up and down due to a repulsive force and an attractive force applied to the magnetic unit 250 in the driving unit 240. Here, the driving unit 240 may move up and down while rotating about the driving controller 249, and the driving unit 240 may rotate in a state in which the driving controller 249 is arranged in the driving groove 234. For example, the driving controller 249 may rotate in the driving groove 234. Also, in an alternative embodiment, the driving controller 249 may slightly move up and down while rotating in the driving groove 234.

A first moving region 245 and a second moving region 248 may be arranged in the separate area SA between the first driving member 243 and the second driving member 244.

The first moving region 245 and the second moving region 248 may be regions that respectively serve as references for a lowest point and a highest point of the movement of the driving unit 240.

For example, when the first moving region 245 is at a Lowermost portion, that is, a region closest to the coil unit 220, the driving unit 240 is at the lowest point, and accordingly, the expression unit 210 is at the lowest point, in detail, a protrusion height of the expression unit 210 from the base unit 230 has a minimum value.

Also, when the second moving region 248 is at a lowermost portion, that is, a region closest to the coil unit 220, the driving unit 240 is at the highest point, and accordingly, the expression unit 210 is at the highest point, in detail, a protrusion height of the expression unit 210 from the base unit 230 has a maximum value.

In an alternative embodiment, the first moving region 245 and the second moving region 248 may be supported by the extension unit 271. That is, when the driving unit 240 is moved, the extension unit 271 is arranged to correspond to the separate area SA between the first driving member 243 and the second driving member 244, so as to support the first moving region 245 and the second moving region 248 according to time.

In an alternative embodiment, a connecting region 247 may be arranged between the first moving region 245 and the second moving region 248, and the connecting region 247 may include a curved surface.

When the driving unit 240 rotates, the extension unit 271 may support at least a region of the connecting region 247 before supporting the second moving region 248 after supporting the first moving region 245, and as such, the driving unit 240 naturally moves and the movement of the expression unit 210 may be accurately controlled.

A distance between the driving surface 241a and the first moving region 245 may be different from a distance between the driving surface 241a and the second moving region 248. For example, the distance between the driving surface 241a and the first moving region 245 may be greater than the distance between the driving surface 241a and the second moving region 248.

In an alternative embodiment, due to the shape of the driving unit 240, a distance from the central axis to the first moving region 245 may be less than a distance from the central axis to the second moving region 248.

In an alternative embodiment, a distance from the driving controller 249 to the first moving region 245 may be equal or similar to a distance from the driving controller 249 to the second moving region 248, and in an additional alternative embodiment, a distance from the driving controller 249 to the connecting region 247 may be also equal or similar to the distance from the driving controller 249 to the second moving region 248.

For example, the connecting region 247 may correspond to at least a region of a circumference having a radius around a center point of the driving controller 249, and the first moving region 245 and the second moving region 248 may be formed as flat surfaces extending in parallel with each other from the regions facing each other and corresponding to a diameter of the circumference.

As such, when the driving unit 240 rotates about the driving controller 249, the position of the driving controller 249 may be maintained identically or similarly when the support unit 270 supports the first moving region 245, the second moving region 248, and the connecting region 247.

Also, when being supported by the support unit 270, the connecting region 247 includes a curved surface or a nearly arc surface, and thus, the driving unit 240 may move smoothly and sufficiently.

Figure 9:
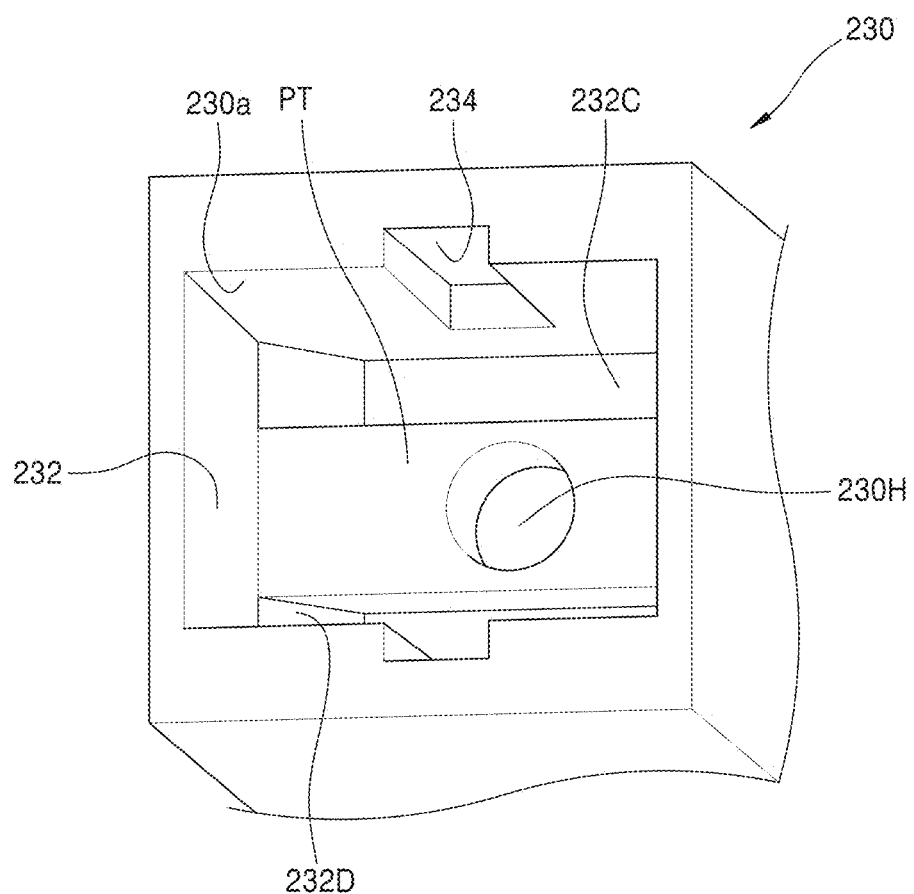
FIG. 9 is a partially perspective view of a portion of a base unit of FIG. 4 seen from one direction.

Referring to FIG. 9, the second accommodation unit 232 of the base unit 230 may include a first groove 233c and a second groove 233d.

The first groove 233c and the second groove 233d may extend in a direction towards the coil unit 220. The first driving member 243 and the second driving member 244 may respectively correspond to the first groove 233c and the second groove 233d. As such, when the driving force is transferred to the driving unit 240 via the coil unit 220, the driving unit 240 may perform an angular or rotational movement in a state in which the first driving member 243 and the second driving member 244 of the driving unit 240 are arranged to correspond to the first groove 233c and the second groove 233d, and may move up and down. Accordingly, the driving unit 240 may be stably moved, and accurate control of the movement of the expression unit 210 may be easily performed.

In an alternative embodiment, a protrusion region PT may be formed between the first groove 233c and the second groove 233d. For example, the protrusion region PT may include the above-described through hole 230H formed therein.

The extension unit 271 of the support unit 270 may correspond to the through hole 230H. Here, the extension unit 271 may protrude through the through hole 230H more than the protrusion region PT, and in this case, the first moving region 245 and the second moving region 248 may be supported by the extension unit 271 according to time.

In an embodiment, the first moving region 245 may be supported by the upper end of the extension unit 271. In an embodiment, the first moving region 245 may be supported by the upper end of the extension unit 271 through contact.

Through this, the state in which the expression unit 210 is at the lowest point may include being implemented by being physically latched by the upper end of the extension unit 271.

In an embodiment, the second moving region 248 may be supported by the upper end of the extension unit 271. In an embodiment, the second moving region 248 may be supported by the upper end of the extension unit 271 through contact.

Through this, the state in which the expression unit 210 is at a point which is different from the lowest point, as an alternative embodiment, at the highest point, may include being implemented by being physically latched by the upper end of the extension unit 271.

In an alternative embodiment, the extension unit 271 may not further protrude as compared with the protrusion region PT, and in this case, the first moving region 245 and the second moving region 248 may be supported by the protrusion region PT according to time.

For example, the first moving region 245 is supported by the top surface of the protrusion region PT, and the state in which the expression unit 210 is at the lowest point may include being implemented by being physically latched by the top surface of the protrusion region PT.

For example, the second moving region 248 is supported by the top surface of the protrusion region PT, and the state in which the expression unit 210 is at the highest point may include being implemented by being physically latched by the top surface of the protrusion region PT.

Also, in an alternative embodiment, the extension unit 271 or the protrusion region PT may not support or may temporarily support the driving unit 240, and in this case, the driving controller 249 may be supported by a region of the second accommodation unit 232 of the base unit 230, for example, may be supported by a boundary surface of the driving groove 234.

Figure 10A:
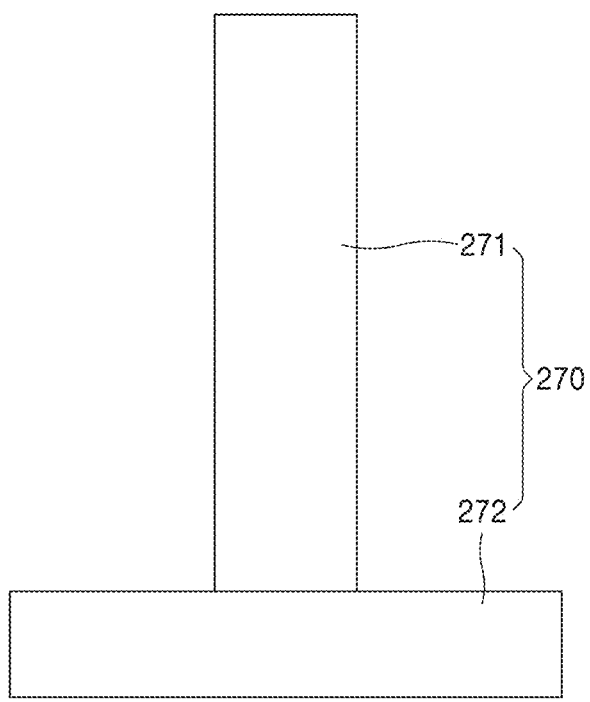
FIG. 10A and FIG. 10B are diagrams showing a support unit in the information output apparatus of FIG. 4 and a modified example of the support unit.
Figure 10B:
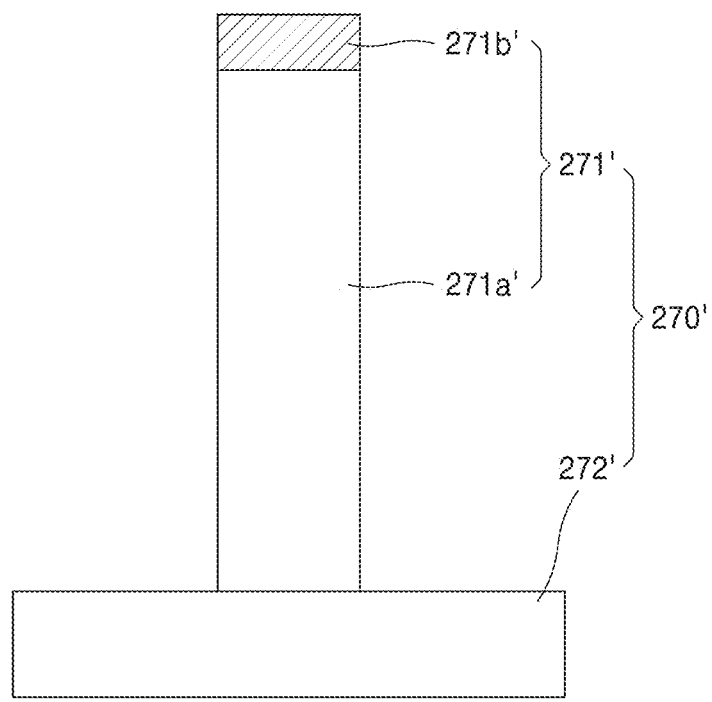

FIG. 10A and FIG. 10B are diagrams showing a support unit in the information output apparatus of FIG. 4 and a modified example of the support unit.

Referring to FIG. 10A, as described above, the support unit 270 according to the embodiment includes the main body 272, and the main body 272 may be arranged to be connected to the extension unit 271 and to support the coil unit 220.

In addition, as an alternative embodiment, the support unit 270 may include a magnetic material, for example, a permanent magnet material, and, even when a current flows through the coil unit 220, the support unit 270 may be fixed without moving up and down.

In addition, as a modified example, referring to FIG. 10B, a support unit 270' includes a main body 272' that may be arranged to be connected to an extension unit 271' and support the coil unit 220. An upper member 271b' may be formed on an end of the extension unit 271' and the upper member 271b' may include a different material from that of the extension unit 271'.

In an alternative embodiment, the upper member 271b' may include a material such as plastic, ceramic, etc. For example, the extension unit 271' may include a magnetic material and the upper member 271b' may include a plastic material.

The embodiment illustrated with reference to FIG. 10B may be selectively applied to other embodiments described herein.

Figure 11A:
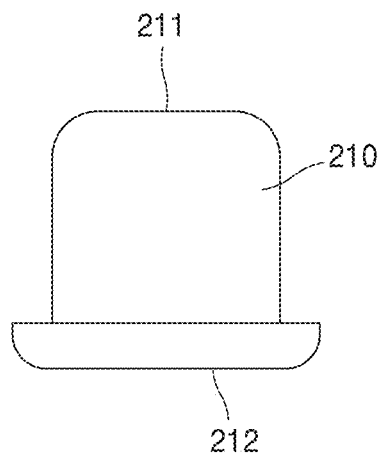
FIG. 11A and FIG. 11B are diagrams showing an expression unit of the information output apparatus of FIG. 4 and a modified example of the expression unit.
Figure 11B:
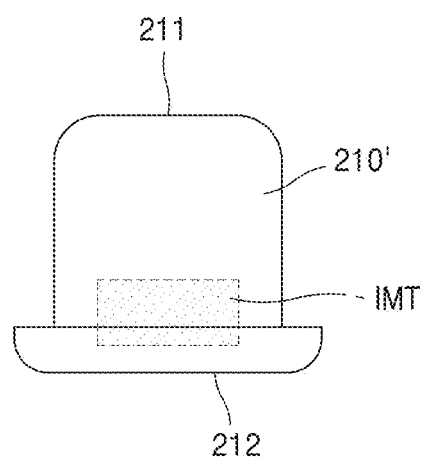

FIG. 11A and FIG. 11B are diagrams showing an expression unit of the information output apparatus of FIG. 4 and a modified example of the expression unit.

Referring to FIG. 11A, the expression unit 210 according to the embodiment may include an expression surface 211 and a support surface 212.

Also, as a modified example, referring to FIG. 11B, an expression unit 210' may include an expression surface 211' and a support surface 212', and may include a magnetic body IMT therein. The expression unit 210' may be driven through the driving unit 240 more efficiently by using the magnetic body IMT of the expression unit 210', and the power consumption may be reduced.

The embodiment illustrated with reference to FIG. 11B may be selectively applied to other embodiments described herein.

Figure 12:
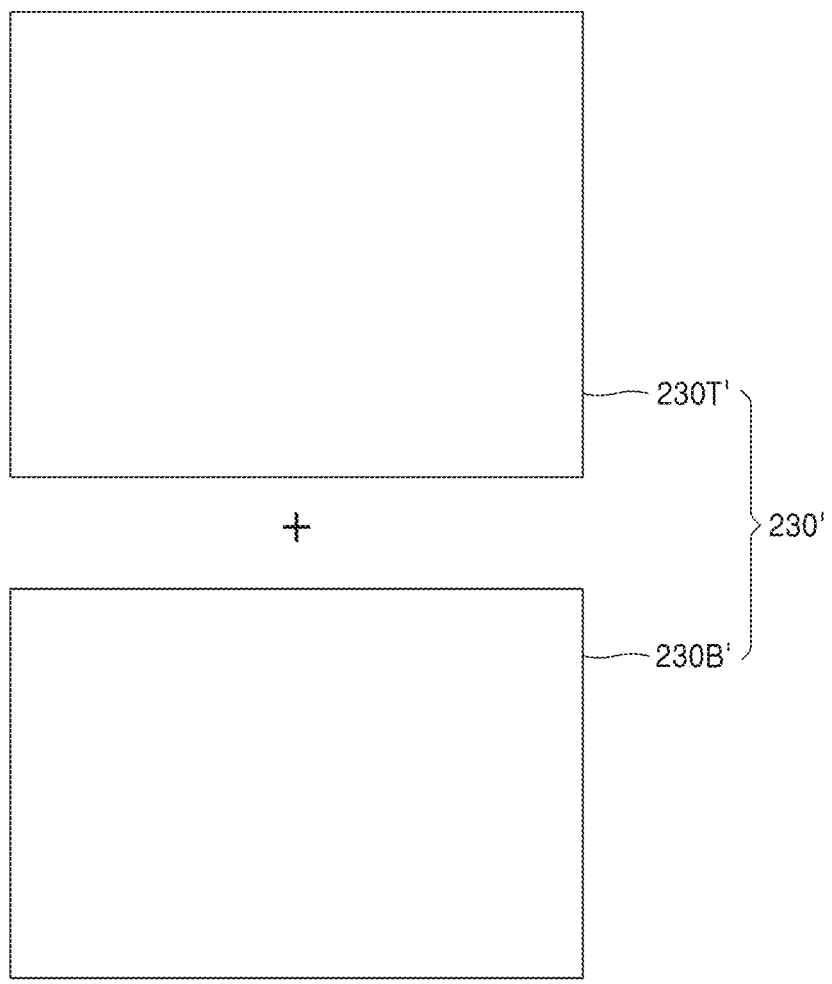
FIG. 12 is a diagram showing a modified example of the base unit in the information output apparatus of FIG. 4.

FIG. 12 is a diagram showing a modified example of the base unit in the information output apparatus of FIG. 4.

Referring to FIG. 12, a base unit 230' of the embodiment may include a top base member 230T' and a bottom base member 230B'. The base unit 230' is formed to have separated upper and lower portions, and the top base member 230T' and the bottom base member 230B' may respectively include a first accommodation unit and a second accommodation unit.

As such, the members may be easily arranged in each of the first accommodation unit and the second accommodation unit of the top base member 230T' and the bottom base member 230B', that is, the driving unit, the coil unit, the support, and the expression unit may be easily arranged.

In an alternative embodiment, the driving unit, the coil unit, the support, and the expression unit are arranged in each of the second accommodation unit of the top base member 230T' and the first accommodation unit of the bottom base member 230B', and after that, the top base member 230T and the bottom base member 230B' are coupled to each other to manufacture the information output apparatus, thereby improving convenience in manufacturing operations.

The embodiment illustrated with reference to FIG. 12 may be selectively applied to other embodiments described herein.

The information output apparatus according to the embodiment may include one or more information output units, the driving unit of the information output unit may be moved at least in a first direction or an opposite direction, and the expression unit is also moved in the first direction or the opposite direction according to the movement of the driving unit so as to output various information sensed by the user.

For example, the information output apparatus according to the embodiment may allow the user to sense the surface of the expression unit via a tactile sense when the expression unit protrudes. In more detail, the information output apparatus may output information in the form of braille output.

In an alternative embodiment, the information output apparatus may output visually sensible information, that is, when the expression unit protrudes, the user senses the expression unit visually. In particular, when one surface of the expression unit, for example, an upper surface is formed to have a color or to emit light, the visual effect may be improved.

As such, the information output apparatus according to the embodiment may output information to the user, and in an alternative embodiment, when the information output apparatus of the embodiment includes a plurality of information output units, various kinds of information may be output to the user.

Also, the driving unit may be easily moved in the first direction, for example, rises due to the magnetic field generated by the coil unit, and may be rotated while maintaining a certain region by the driving controller.

For example, when a repulsive force is generated by the magnetic field that is generated from the coil unit according to the polarity of the magnetic unit arranged in the driving unit, the driving unit may be moved up and may be rotated in a state in which the first moving region and the second moving region, and the connecting region between the first and second moving regions are supported.

As such, the moving up and down of the driving unit may be performed softly and naturally, and accordingly, an irregular intermittence in moving up and down of the expression unit may be reduced. In addition, the flexible movement and precise motion may be easily controlled.

As the expression unit moves up and down, turning-on or turning-off state of the information output apparatus may be easily implemented.

Also, during the moving up and down operation of the driving unit, even when the force applied to the driving unit is removed, the status of the driving unit may be maintained through the supporting of the first moving region and the second moving region by the extension unit.

That is, after the driving unit is moved up from a state, in which the first moving region is supported by the extension unit of the driving unit, to a state, in which the second moving region is supported by the extension unit, due to the magnetic field of the coil unit, the driving unit maintains the state in which the second moving region is supported by the extension portion even when the power connected to or the electric current or voltage applied to the coil unit is removed.

Also, after the driving unit is moved down from a state, in which the second moving region is supported by the extension unit, to a state, in which the first moving region is supported, due to the magnetic field in opposite direction from the coil unit, the driving unit may maintain the state even when the power source connected or the electric current or voltage applied to the coil unit is removed.

As such, the turning-on or turning-off state of the expression unit of the information output apparatus may be easily switched and maintained, the power consumption for moving the expression unit may be reduced, and a total energy efficiency of the information output apparatus may be improved.

In addition, the driving controller included in the driving unit of the embodiment is eccentric with respect to the central axis of the driving unit, and accordingly, a torque may be easily generated on the driving unit to implement the moving up and moving down of the driving unit via the rotation, and thus, the movement of the expression unit may be controlled accurately, smoothly, and naturally.

In an alternative embodiment, the magnetic unit included in the driving unit may overlap the driving controller, for example, a center of the magnetic unit may overlap the driving controller.

As such, a variation in the position of the magnetic unit may be reduced when the driving unit rotates about the driving controller, for example, a consistent or similar distance between the coil unit and the magnetic unit may be maintained. As a result, uneven influence of the effects that the magnetic field exerts from the coil unit to the magnetic field may be reduced, and the movement of the driving unit may be accurately controlled.

Figure 13:
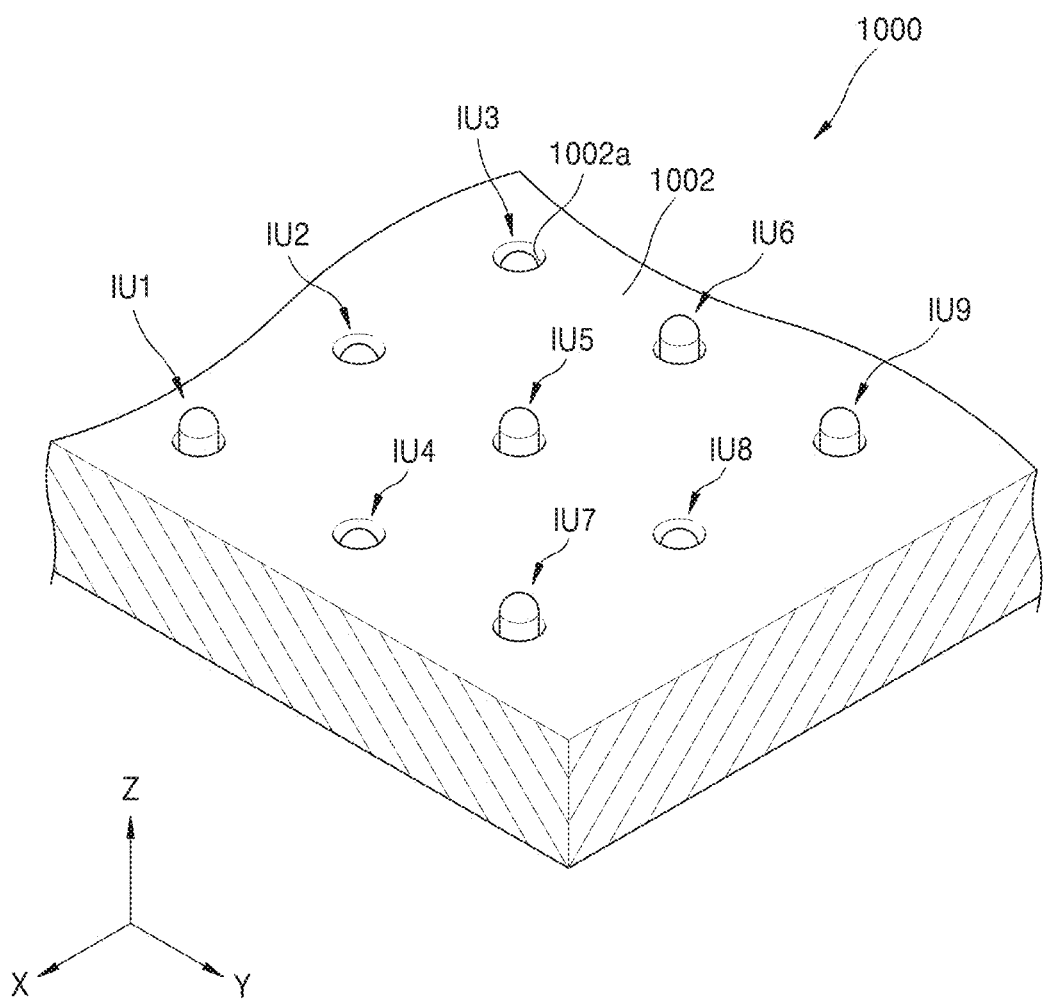
FIG. 13 is a perspective view schematically showing an information output apparatus according to another embodiment of the disclosure.

FIG. 13 is a perspective view schematically showing an information output apparatus according to another embodiment of the disclosure.

Referring to FIG. 13, an information output apparatus 1000 according to the embodiment includes a plurality of information output units IU1 to IU9.

In FIG. 13, nine information output units are shown, but the information output apparatus 1000 may include variety numbers of information output units in an alternative embodiment.

That is, the information output apparatus 1000 may include a variety of numbers of information output units according to a purpose of using the product, characteristics of an applied product, and user characteristics.

In addition, the information output apparatus 1000 may include a housing 1002 for protecting the plurality of information output units IU1 to IU9, and the housing 1002 may include a via hole 1002a that corresponds to each of the information output units.

Each of the information output units is the same as that of the above embodiments, and thus descriptions thereof are omitted.

In the above embodiment, the base unit 130 or 230 may extend to correspond to at least the plurality of information output units. Also, in another example, the base unit 130 or 230 may be integrally provided to correspond to the plurality of information output units.

Also, the base unit 130 or 230 may be separately formed to correspond to each of the plurality of information output units.

For example, each of the information output units IU1 to IU9 may include the first accommodation unit 131 or 231 and the second accommodation unit 132 or 232 in the above embodiments.

Also, in an alternative embodiment, the housing 1002 shown in FIG. 13 may include the information output apparatus 100 or 200 as a unit.

The information output apparatus of the embodiment may include the plurality of information output units, and each of the information output units is described in the above embodiments.

The information output apparatus according to the embodiment may respectively control the driving unit included in each of the units to move the expression unit, and various information that the user may sense may be output through the movement of the expression unit.

For example, the information output apparatus according to the embodiment may allow the user to sense the surface of the expression unit via a tactile sense when the expression unit protrudes. In more detail, the information output apparatus may output information in the form of braille output.

In an alternative embodiment, the information output apparatus may output visually sensible information, that is, when the expression unit protrudes, the user senses the expression unit visually. In particular, when one surface of the expression unit, for example, an upper surface is formed to have a color or to emit light, the visual effect may be improved.

Figure 14:
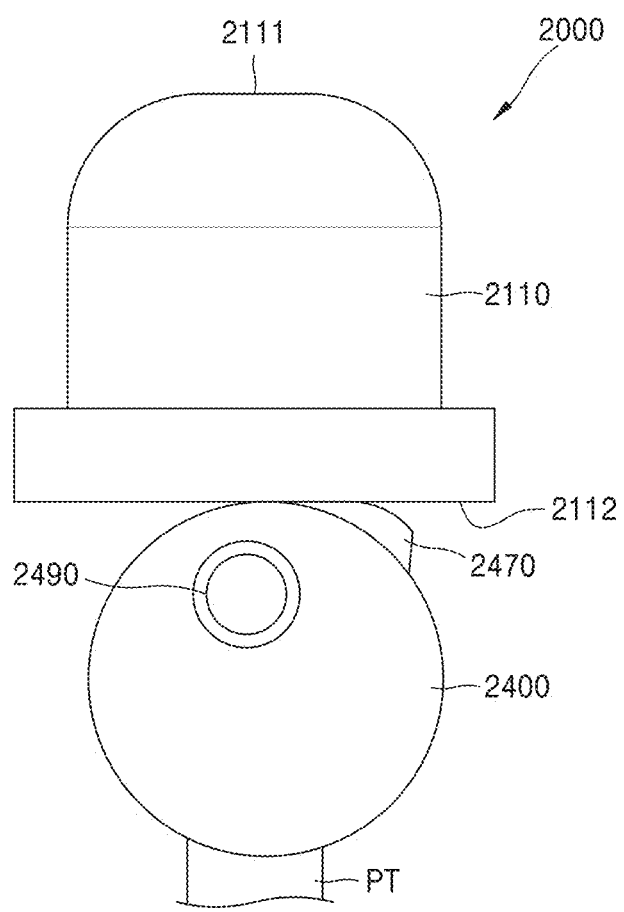
FIGS. 14 and 15 are diagrams schematically illustrating a part of an information output apparatus according to an embodiment of the present disclosure.
Figure 15:
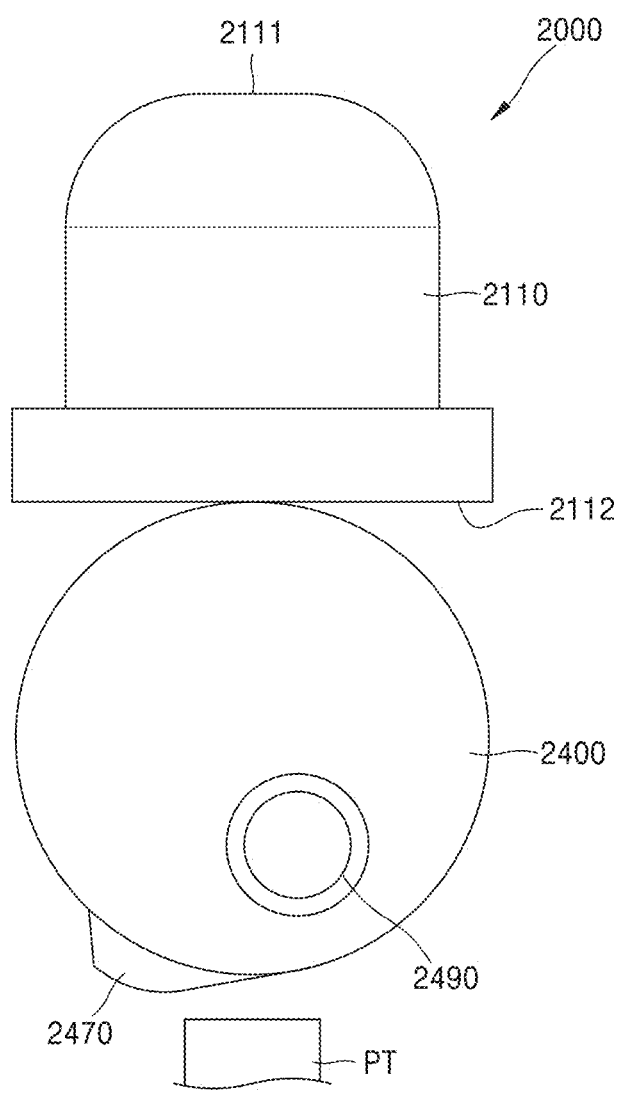

FIGS. 14 and 15 are diagrams schematically illustrating a part of an information output apparatus according to an embodiment of the present disclosure.

Referring to FIGS. 14 and 15, an information output apparatus 2000 includes a driving unit 2400 and an expression unit 2110. Although not illustrated for convenience of explanation, the information output apparatus 2000 may include a member explained in connection with the above-described embodiments, such as a coil unit.

The expression unit 2110 may be moved according to movement of the driving unit 2400, that is, may be moved at least in upper and lower directions based on a lengthwise direction thereof.

The expression unit 2110 may include an expression surface 2111 and a supporting surface 2112.

In addition, although not illustrated, the expression unit 2110 may include a magnetic body (not shown) therein.

As an alternative embodiment, the expression unit 2110 may have a space portion formed therein, and the space portion may be open toward the driving unit 2400.

The driving unit 2400 may be moved, for example, as described in the above-described embodiments, may be moved through a magnetic field generated by a current flowing through the coil unit.

In addition, the driving unit 2400 may be supported by the protrusion region PT during movement. Although not illustrated, the driving unit 2400 may be supported by an extension unit (not shown) described in the above-described embodiment.

As an alternative embodiment, the driving unit 2400 may include a driving controller 2490, for example, on at least one side surface thereof, for example, on facing side surfaces thereof.

As an alternative embodiment, the driving unit 2400 may perform angular or rotational movement around the driving controller 2490.

The stopper part 2470 may be formed in one area of the driving unit 2400. The stopper part 2470 may have a shape protruding to have a height from a driving surface of the driving unit 2400, for example, from an outer surface thereof having a closed curve similar to a circle.

Accordingly, the stopper part 2470 may become a barrier against a member adjacent to the stopper part 2470 as shown in FIGS. 14 and 15.

For example, as shown in FIG. 14, the stopper part 2470 may become a barrier against the supporting surface 2112 of the expression unit 2110 and may be resistance to the continuous angular movement in one direction of the driving unit 2400, and, as shown in FIG. 15, the stopper part 2470 becomes a barrier against the protrusion region PT, and may be a resistance to the continuous angular movement in one direction of the driving unit 2400.

Also, although not illustrated, during the angular movement of the driving unit 2400, the stopper part 2470 may function as various barriers while being supported by adjacent members according to design conditions.

Through the stopper part 2470, it is possible to control the unnecessary continuous angular or rotational movement of the driving unit 2400 to reduce the vibration of the expression unit 2110, and to effectively carry out precise motor control of the expression unit 2110.

In addition, a driving unit 2400' is effectively controlled to reduce power to drive the driving unit 2400'.

Figure 16:
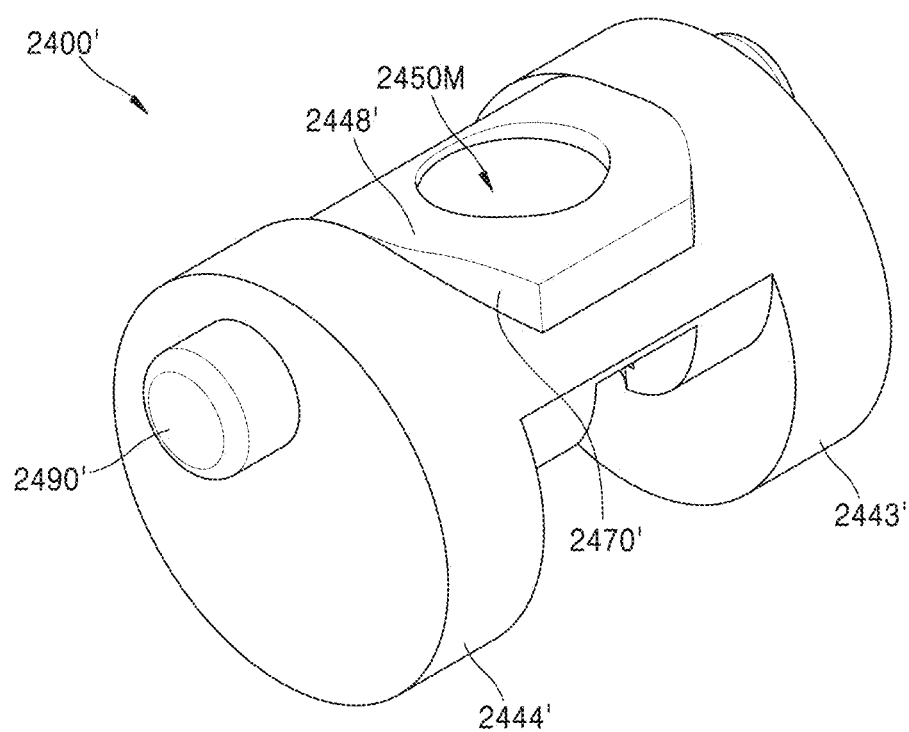
FIGS. 16 and 17 show perspective views of driving units illustrated in FIGS. 14 and 15 according to alternative embodiments.
Figure 17:
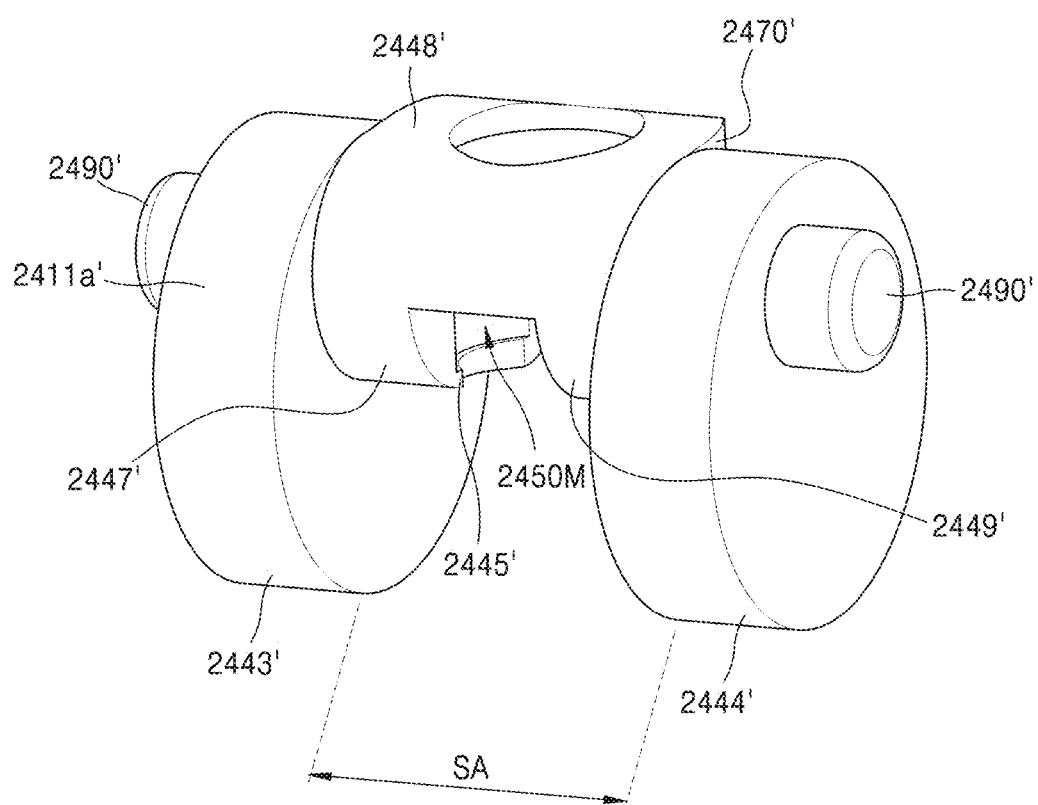

FIGS. 16 and 17 show perspective views of driving units illustrated in FIGS. 14 and 15 according to alternative embodiments.

Referring to FIGS. 16 and 17, the driving unit 2400' may include a first driving member 2443' and a second driving member 2444', which are spaced apart from each other to form a space therebetween.

The first driving member 2443' and the second driving member 2444' may each include a driving surface 2411a' on at least one of outer surfaces thereof so as to support the expression unit 2110 when the driving unit 240 is moved and to provide the expression unit 210 with the driving power.

In an alternative embodiment, the outer surface of each of the first driving member 2443' and the second driving member 2444' may include a curved surface. For example, the first driving member 2443' and the second driving member 2444' may each have a shape similar to a rotator, and may each have a shape similar to a disc.

A driving controller 2490' may be arranged on at least one side surface of each of the first driving member 2443' and the second driving member 2444', for example, on an opposite side surface of each of facing side surfaces of the first driving member 2443' and the second driving member 2444'.

A first moving region 2445' and a second moving region 2448' may be arranged in a separate area SA between the first driving member 2443' and the second driving member 2444'.

As an alternative embodiment, when the driving unit 2400' is moved through the first moving region 2445' and the second moving region 2448', the expression unit 2110 may be raised and lowered.

For example, the first moving region 2445' and the second moving region 2448' may be regions that serve as references for a lowest point and a highest point of the movement of the expression unit 2110.

As an alternative embodiment, the first moving region 2445' and the second moving region 2448' may be supported by a protrusion region PT, and as another example, may be supported by an extension unit (not shown) described in the above-described embodiment.

In an alternative embodiment, a connecting region 2447' may be arranged between the first moving region 2445' and the second moving region 2448', and the connecting region 2447' may have a curved surface.

Although not illustrated as an alternative embodiment, a magnetic unit (not shown) may be located in the driving unit 2400', for example, an inner space 2450M' of the driving unit 2400'. For example, the magnetic unit (not shown) may include a magnetic material, for example, a permanent magnet.

The stopper part 2470' may be formed in one area of the driving unit 2400'. For example, the stopper part 2470' may have a shape protruding from the driving surface 2411a' by at least a height. For example, at least one area of the stopper part 2470' may have a protruding shape to have a height with respect to an outer surface of each of the first driving member 2443' and the second driving member 2444'.

As an alternative embodiment, the stopper part 2470' may be formed to be adjacent to the outer surfaces of the first driving member 2443' and the second driving member 2444', and for example, may be connected to the second moving region 2448'.

As an alternative embodiment, the stopper part 2470' may have a height based on the outer surfaces of the first driving member 2443' and the second driving member 2444' and may include regions having different heights.

For example, from among regions of the stopper part 2470', the height of a region thereof farther from the second moving region 2448' may be greater than the height of a region thereof connected to the second moving region 2448'.

Accordingly, the stopper part 2470' may function as an effective resistance during the angular movement of the driving unit 2400'.

While the present disclosure has been particularly shown and described with reference to exemplary embodiments thereof, it will be understood by those of ordinary skill in the art that various changes in form and details may be made therein without departing from the spirit and scope as defined by the following claims. Therefore, the scope sought to be protected of the disclosure shall be defined by the appended claims.

The particular implementations shown and described herein are illustrative examples of the embodiments and are not intended to otherwise limit the scope of the embodiments in any way. For the sake of brevity, electronics, control systems, software, and other functional aspects of the systems according to the related art may not be described in detail. Furthermore, the connecting lines or connectors shown in the drawings are intended to represent example functional relationships and/or physical or logical couplings between the various elements. It should be noted that many alternative or additional functional relationships, physical connections, or logical connections may be present in a practical device. Moreover, no item or component is essential to the practice of the present disclosure unless the element is specifically described as "essential" or "critical".

The singular forms "a," "an" and "the" in the specification of the embodiments, in particular, claims, may be intended to include the plural forms as well. Unless otherwise defined, the ranges defined herein is intended to include values within the range as individually applied and may be considered to be the same as individual values constituting the range in the detailed description. Finally, operations constituting methods may be performed in appropriate order unless explicitly described in terms of order or described to the contrary. Exemplary embodiments are not necessarily limited to the order of operations given in the description. The examples or exemplary terms (for example, etc.) used herein are to merely describe exemplary embodiments in detail are not intended to limit the embodiments unless defined by the following claims. Also, those of ordinary skill in the art will readily appreciate that many alternations, combinations and modifications, may be made according to design conditions and factors within the scope of the appended claims and their equivalents.

INDUSTRIAL APPLICABILITY

Provided is an information output apparatus including at least one information output unit, the information output unit includes a coil unit connected to a power source to allow an electric current to flow therethrough, a base unit formed to accommodate the coil unit, an expression unit formed and arranged to allow a user to sense the expression unit, and a driving unit arranged in the base unit to be separated from the coil unit, and the driving unit being adjacent to the coil unit to be driven by the electric current flowing through the coil unit to perform an angular or rotational movement so as to move the expression unit in a first direction towards the coil unit and an opposite direction.

What is claimed is:
1. An information output apparatus comprising at least one information output unit,
   wherein the information output unit comprises:
      a coil unit connected to a power source to allow an electric current to flow therethrough;
      a base unit formed to accommodate the coil unit;
      an expression unit formed and arranged to allow a user to sense the expression unit;
      a driving unit arranged in the base unit to be separated from the coil unit, the driving unit being adjacent to the coil unit to be driven by the electric current flowing through the coil unit to perform an angular or rotational movement so as to move the expression unit in a first direction towards the coil unit and an opposite direction;
      a driving controller; and
      a support unit arranged in the base unit and formed to have a length extending in a length direction, facing the expression unit,
   wherein the coil unit is positioned around the support unit,
   wherein the driving unit includes a first driving member, a second driving member and a separate area between the first driving member and the second driving member, wherein the driving controller is arranged on at least one side surface of the first driving member and the second driving member, wherein each of the first driving member and the second driving member includes a driving surface configured to support the expression unit in response to the driving unit performing the movement to move the expression unit, wherein at least a moving region, having a surface spaced apart from the driving surfaces, is arranged in the separate area, and wherein the moving region is configured to be supported by an upper end of the support unit by contacting the upper end of the support unit, wherein the driving unit is configured to perform the angular or rotational movement about the driving controller to drive the expression unit, and wherein a central axis of the driving unit and a central axis of the driving controller are eccentric with respect to each other.

2. The information output apparatus of claim 1, wherein the driving unit includes a magnetic unit having regions of different polarities from each other.

3. The information output apparatus of claim 1, wherein the base unit further comprises a first accommodation unit configured to accommodate the coil unit and a second accommodation unit configured to accommodate the driving unit, the second accommodation unit being arranged adjacent to the first accommodation unit in the first direction.

4. The information output apparatus of claim 3, further comprising a boundary unit between the first accommodation unit and the second accommodation unit, the boundary unit configured to distinguish the first accommodation unit from the second accommodation unit.

5. The information output apparatus of claim 1, wherein the support unit is configured to support the driving unit when the driving unit is moved.

6. The information output apparatus of claim 1, further comprising a plurality of information output units,
wherein the plurality of information output units are arranged to be separated from one another in at least one direction.

7. The information output apparatus of claim 1, wherein the driving surfaces include a curved surface.

8. The information output apparatus of claim 1, wherein each of the first driving member and the second driving member has a rotator or disc shape.

9. The information output apparatus of claim 8, wherein each of the first driving member and the second driving member is configured to perform a rotational or angular movement.

10. The information output apparatus of claim 9, wherein in response to the first driving member and the second driving member performing the rotational or angular movement, driving power is configured to be provided to a supporting surface of the expression unit so that the expression unit effectively makes continuous movement.

11. An information output apparatus comprising at least one information output unit,
wherein the information output unit comprises:
a coil unit connected to a power source to allow an electric current to flow therethrough;
a base unit formed to accommodate the coil unit;
an expression unit formed and arranged to allow a user to sense the expression unit;
a driving unit arranged in the base unit to be separated from the coil unit, the driving unit being adjacent to the coil unit to be driven by the electric current flowing through the coil unit to perform an angular or rotational movement so as to move the expression unit in a first direction towards the coil unit and an opposite direction;
a driving controller; and
a support unit arranged in the base unit and formed to have a length extending in a length direction, facing the expression unit, wherein the coil unit is positioned around the support unit, wherein the driving unit includes a first driving member, a second driving member and a separate area between the first driving member and the second driving member, wherein the driving controller is arranged on at least one side surface of the first driving member and the second driving member, wherein each of the first driving member and the second driving member includes a driving surface configured to support the expression unit in response to the driving unit performing the movement to move the expression unit, wherein at least a moving region, having a surface spaced apart from the driving surfaces, is arranged in the separate area, and wherein the moving region is configured to be supported by an upper end of the support unit by contacting the upper end of the support unit, wherein the driving unit is configured to perform the angular or rotational movement about the driving controller to drive the expression unit, and wherein during the angular or rotational movement of the driving unit, the driving unit is further configured to provide upward and downward movements for causing the driving controller is configured to move up and down in response to the driving unit making an upward movement and a downward movement.

* * * * *